United States Patent
Diaconu et al.

(10) Patent No.: US 12,093,248 B1
(45) Date of Patent: Sep. 17, 2024

(54) ONLINE INDEX CREATION FOR MULTI-VERSION DATABASE WITHOUT TABLE LOCKS

(71) Applicant: Snowflake Inc., Bozeman, MT (US)

(72) Inventors: Cristian Diaconu, Kirkland, WA (US); Nikolaos Romanos Katsipoulakis, Redwood City, CA (US); Alexander Miller, San Mateo, CA (US); Dimitrios Tsirogiannis, Belmont, CA (US); William Waddington, Stateline, NV (US); Zhaohui Zhang, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/313,768

(22) Filed: May 8, 2023

(51) Int. Cl.
*G06F 16/23* (2019.01)
*G06F 16/22* (2019.01)

(52) U.S. Cl.
CPC .......... *G06F 16/2379* (2019.01); *G06F 16/22* (2019.01); *G06F 16/2365* (2019.01)

(58) Field of Classification Search
None
See application file for complete search history.

(56) References Cited

U.S. PATENT DOCUMENTS

| 7,272,589 B1* | 9/2007 | Guay | G06F 16/22 707/999.005 |
| 11,327,937 B1* | 5/2022 | Muniswamy Reddy | G06F 16/2228 |
| 2009/0037366 A1* | 2/2009 | Shankar | G06F 16/2272 |
| 2009/0037417 A1* | 2/2009 | Shankar | G06F 16/2343 |
| 2009/0240895 A1* | 9/2009 | Nyland | G06F 9/3891 711/149 |
| 2010/0228764 A1* | 9/2010 | Sallakonda | G06F 16/24565 707/769 |
| 2012/0330964 A1* | 12/2012 | Baude | G06F 16/2272 707/741 |
| 2015/0052104 A1* | 2/2015 | Shadmon | G06F 16/2343 707/613 |
| 2015/0278275 A1* | 10/2015 | Kumar | G06F 16/2308 707/696 |
| 2016/0378822 A1* | 12/2016 | Jovanovic | G06F 16/2228 707/715 |
| 2018/0322156 A1 | 11/2018 | Lee et al. | |
| 2022/0092051 A1 | 3/2022 | Miller et al. | |

OTHER PUBLICATIONS

Antonopoulos, Panagiotis, "Resumable Online Index Rebuild in SQL Server", (Aug. 1, 2017), 12 pages.

(Continued)

*Primary Examiner* — Irene Baker
(74) *Attorney, Agent, or Firm* — Schwegman Lundberg & Woessner, P.A.

(57) ABSTRACT

The subject technology receives a statement to initiate an online index building process of an index. The subject technology determines that the index can be generated. The subject technology performs a write operation to store an index record indicating an initial status of the online index building process. The subject technology performs a statement fencing process. The subject technology performs a back-filling process of the index. The subject technology validates the index.

18 Claims, 16 Drawing Sheets

(56) References Cited

OTHER PUBLICATIONS

Mohan, C., "Algorithms for Creating Indexes for Very Large Tables Without Quiescing Updates", Data Base Technology Institute, IBM Almaden Research Center, (Jun. 1992), 10 pages.

"U.S. Appl. No. 18/313,834, Non Final Office Action mailed Nov. 29, 2023", 18 pgs.

"U.S. Appl. No. 18/313,834, Final Office Action mailed Mar. 27, 2024", 19 pgs.

"U.S. Appl. No. 18/313,834, Response filed Feb. 29, 2024 to Non Final Office Action mailed Nov. 29, 2023", 12 pgs.

* cited by examiner

US 12,093,248 B1

ONLINE INDEX CREATION FOR MULTI-VERSION DATABASE WITHOUT TABLE LOCKS

TECHNICAL FIELD

Embodiments of the disclosure relate generally to a network-based database system or a cloud data platform and, more specifically, to processing concurrent transactions to enable OLTP (Online Transactional Processing) in a safe and performant manner within the database system.

BACKGROUND

Cloud-based data warehouses and other database systems or data platforms sometimes provide support for transactional processing, referred to as OLTP, that enable such systems to perform operations that are not available through the built-in, system-defined functions. However, for mitigating security risks, security mechanisms to ensure that user code running on such systems remain isolated are needed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
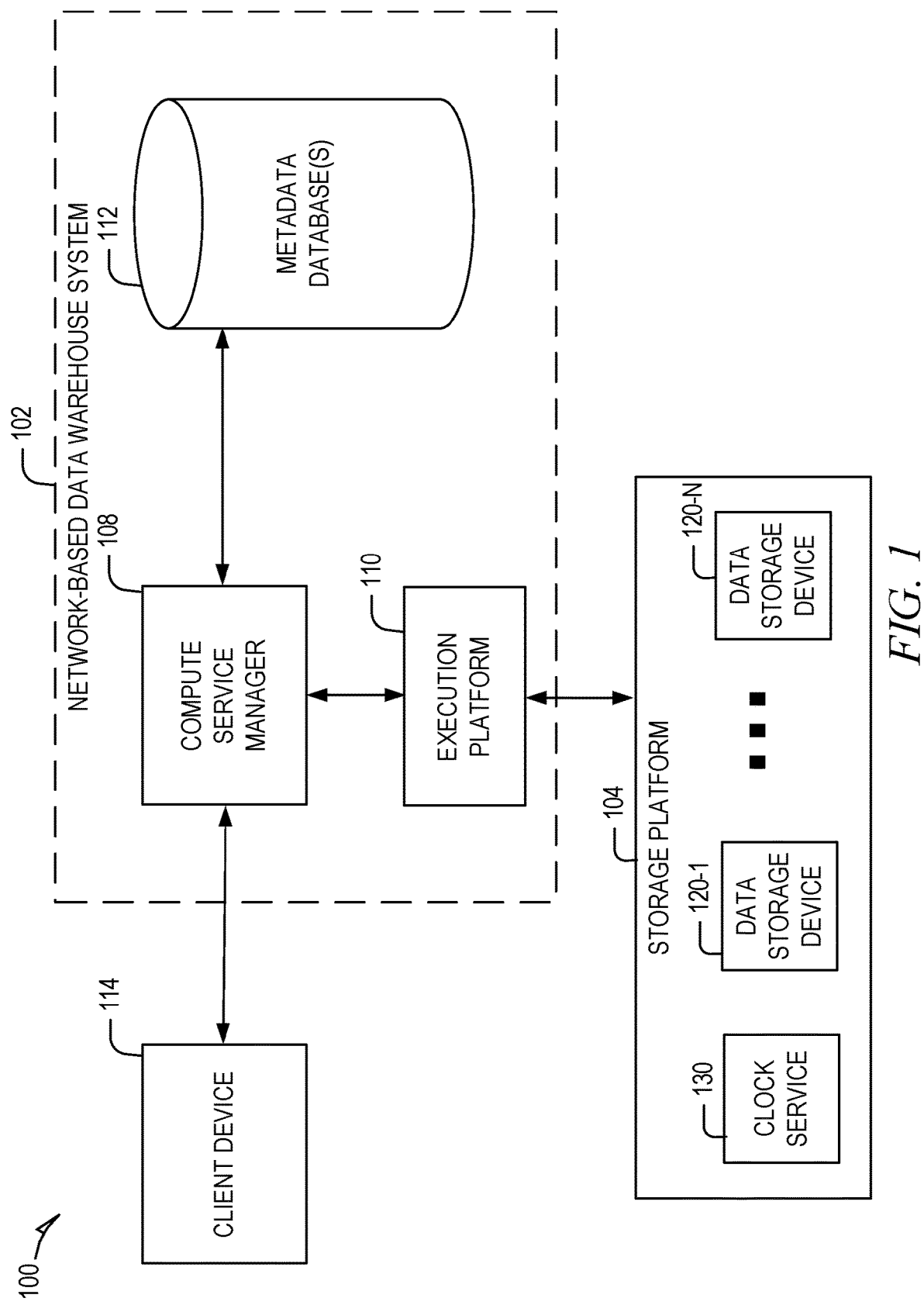
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including OLTP techniques. As discussed herein, OLTP (Online Transactional Processing) refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions occur within and users are working in a distributed and networked environment from varying locations and computing environments. Thus, it is also increasingly important to ensure such transactions execute and complete in a concurrent manner that protects the integrity and consistency of the data in such a distributed environment.

As described herein, the subject technology provides concurrency control and isolation for executing a series of query statements (e.g., SQL statements) within a transaction against a linearizable storage. In particular, the subject technology employs a concurrency control mechanism that is a combination of a multi-version concurrency control (MVCC) for read operations and locking for write operations. Additionally, the subject technology implements a targeted isolation level (e.g., snapshot isolation), where each statement can execute against a different snapshot of a database, and write locks are held until a transaction commit.

Further, as described herein, a multi-version concurrency control (MVCC) database system cannot preserve a logical order across Data Manipulation Language (DML) and Data Definition Language (DDL) statements, when table locking is not available. This results in non-deterministic behavior in the presence of workloads with a mix of concurrent DDL and DML statements. Hybrid tables (e.g., stored on linearizable storage provided by a distributed database such as FoundationDB) do not have table-level locking.

In order to support features requiring a logical ordering across DDL and DML statements (e.g., online DDL functionality) for hybrid tables, without the use of table locks, a "query fence" (or logical barrier) is needed. This query fence guarantees that after a fence is established, all statements are aware of all committed metadata changes. Embodiments of the subject technology enable a fencing mechanism for guaranteeing that in-flight or executing statements will not be allowed to execute with outdated table metadata.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWSR, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
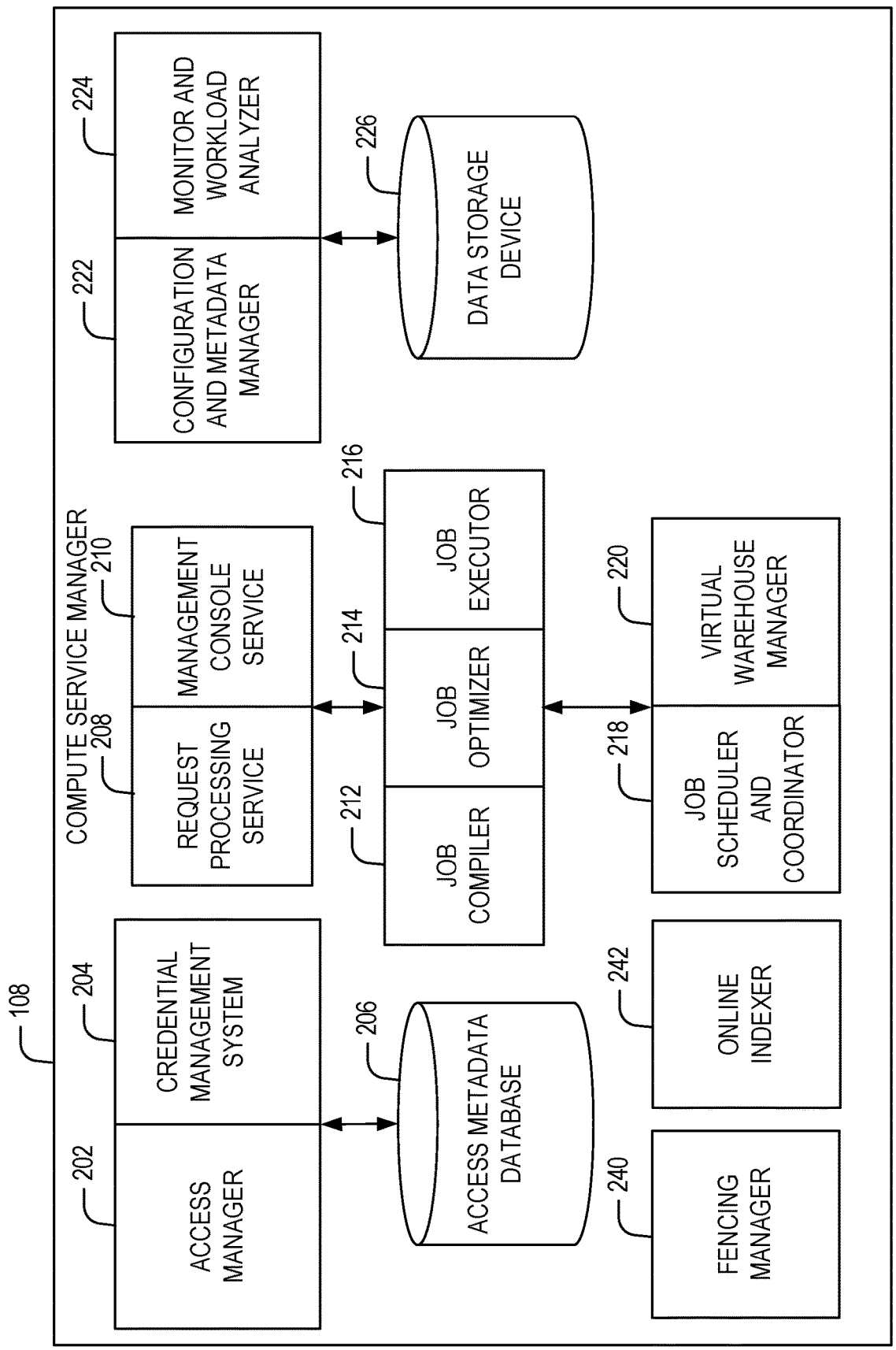
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

In some embodiments, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As further illustrated, compute service manager includes a fencing manager 240 which performs operations in connection with enabling a statement fencing mechanism as described further herein.

As also illustrated, compute service manager 108 includes online indexer 242, which performs operations in connection with support an online index, including a process for online index building, and is described further herein.

Figure 3:
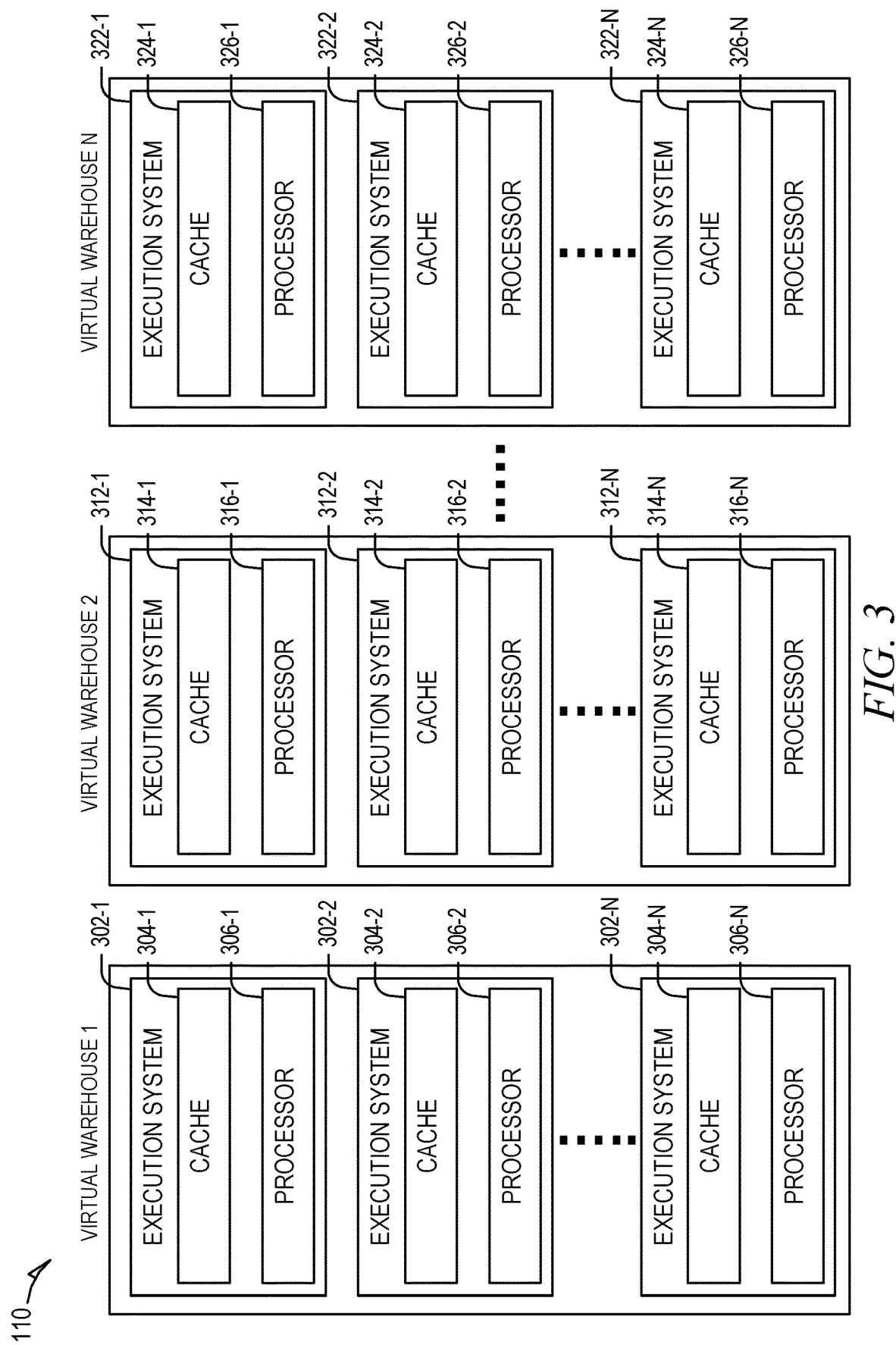
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
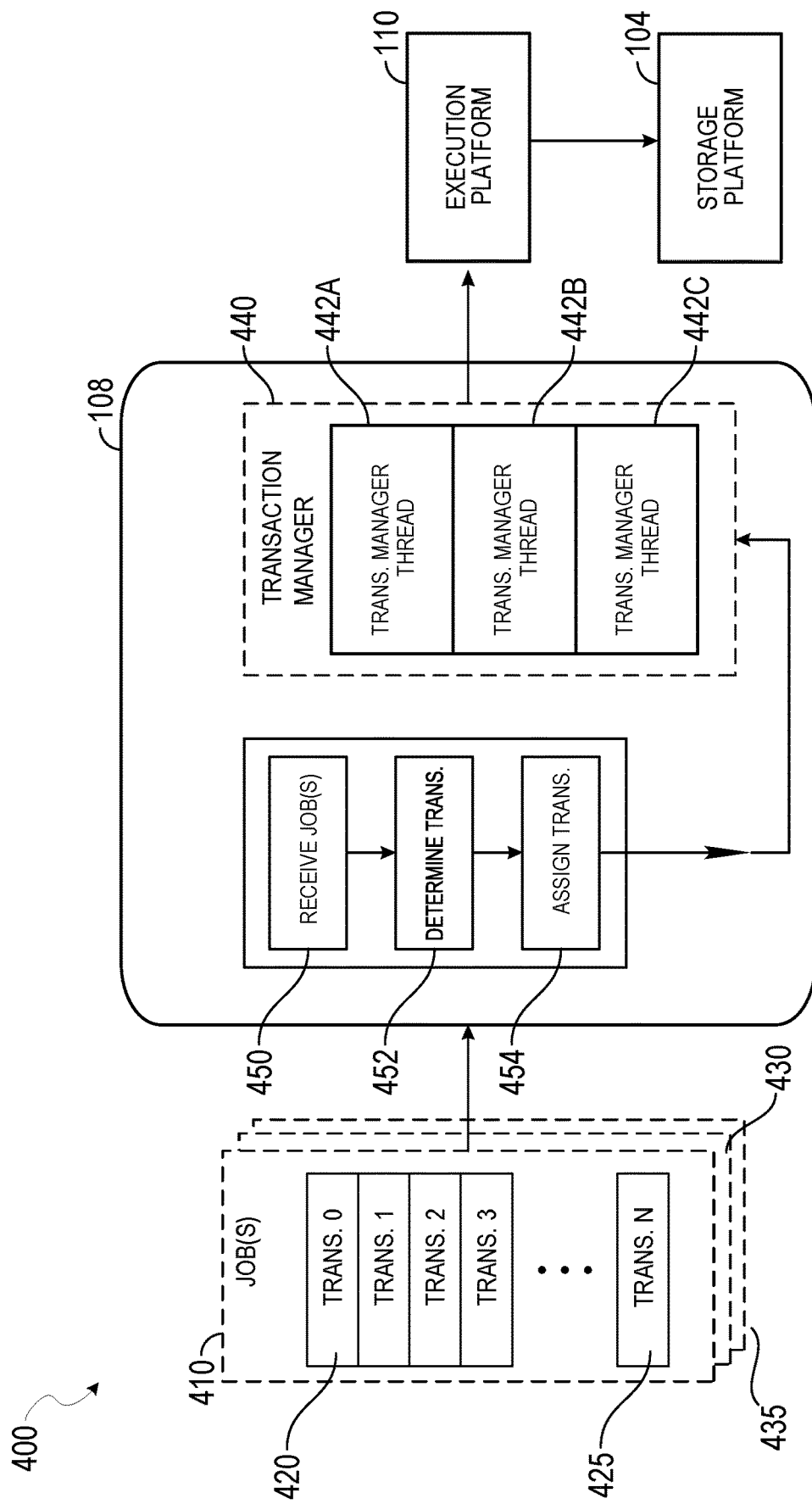
FIG. 4 is a computing environment conceptually illustrating an example software architecture for managing and executing concurrent transactions on a database system, which can be performed by a given execution node of the execution platform, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442a, 442b, 442c, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., FoundationDB, and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g., for a cluster, the table being clustered is the target).

In an embodiment, the transaction manager 440 determines transactions at 452 and assigns transactions at 454 that must be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions must be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The subject technology provides concurrency control and isolation for executing transactions against (e.g., a series of SQL Statements within a SQL Transaction) against linearizable storage (e.g., a linearizable key-value store). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table must take effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1
S1 starts a FoundationDB Transaction, and uses its Read Version as the Read Timestamp
S1 wishes to write object X, so it first reads object X as of the Read Timestamp
Finding no conflicts, S1 writes X, using a timestamped operation to embed the commit timestamp in the key and setting IsCommitEmbedded.
S1 sets a read conflict range on the FoundationDB transaction for all keys with a prefix of X
S1 writes a transaction status entry for ID, directly setting it to committed.
T1 commits the FoundationDB Transaction.
If the transaction commits, then there were no concurrent conflicting transactions.
If the transaction is aborted, then there was a concurrency conflicting transaction for one of the writes that were done. None of S1's writes, nor the transaction status entry will be persisted. S1 must now restart in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext is instantiated with this stamp, and applies it to all writes performed through the StatementContext instance.

In embodiments, object keys are "stamped" by appending additional information to each key. In an example, a stamp includes a three-part tuple of (Transaction ID, statementNumber, restartCount) along with other information. The higher order component is a transaction identifier assigned to the SQL-level transaction. The statementNumber identifies the SQL statement within the SQL-level BEGIN/COMMIT block. The restart count tracks which statement restart attempt generated this write. In an implementation, a StatementContext is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's readTimestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

There is no need to check for WR conflicts. To illustrate, consider the following example.

Assume that a pre-existing object X had been written with a stamp of TXN1.0.0, with a commit timestamp of 10.

T2 begins, and creates an instance S1 of a StatementContext with the stamp (ID=TXN2, statementNumber=1, restartCount=0).

//Assume the constructor for the statement obtains a readTimestamp (RTS) of 15.

S1 issues a read for all keys with a prefix of "X.", reading all versions and their stamps for X The read returns [X.TXN1.0.0].

S1 looks up the TxnID of TXN1 in the Transaction Status Table, and sees that it has a commit timestamp of 10. Since 10<15.1.0, X is visible to T2.

// As no writes were done, S1 does not require finalize( ) nor does T2 need to commit( ).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:
{
    S1 starts a transaction
    S1 writes X.TXN2.1.0 with a value of 100 S1 commits the transaction
    // The next step is for S1 to check for WW conflicts by checking whether there is
    // another transaction that has updated X between the RTS and S1's write.
    S1 starts an transaction
    S1 issues the range read [X.0, X.inf] to obtain the set all versions of X and their stamps
    The read returns [X.TXN1.0.0, X.TXN2.1.0].
    S1 looks up TXN1 in the Transaction Status Table, finds a commit timestamp of 10.
    10 is earlier than our read timestamp of 15, so it is not a conflict. S1 ignores [X.TXN2.1.0] as it belongs to S1
    S1 commits the transaction
    // Assume for now, there were no conflicts detected S1 starts a transaction
    S1 finalizes, and records (statement number=1, restart count-0) into the transaction
    status table for TXN2
    S1 commits the transaction
}
T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTN of the transaction.

Unlike traditional database systems, the subject system may not include have a dedicated lock manager. Instead, in an example, a transaction will first write a key and then perform a range read to detect conflicts. The lock order of a key for a transaction is determined based on the first time the key was written by the transaction (unless the statement that wrote the key was explicitly aborted, which would release all acquired locks). The write protocol for transaction T is further discussed in the following.

In an implementation, each row (object) updated requires two separate transactions:
1) The first transaction of T inserts a new version of the object with its key X suffixed with three-part suffix (T.ID, T.statementNumber, T.restartCount).
2) The second transaction issues a range read with the prefix "X." to obtain the SCT (set of conflicting transactions). The result set is a list of committed or active transactions who wrote X before T, e.g., their lock order is before T. The conflicting transactions Ti in the SCT can be classified as follows:
  i) Ti has committed before T's read timestamp. In this case, T and Ti do not have WW (write-write) conflicts and Ti can be safely ignored.
  ii) Ti has committed after T's read timestamp. In this case, T and Ti have WW conflicts and T has to restart the current statement without waiting for Ti.
  iii) Ti is still active. In this case T and Ti have WW conflicts and T has to wait until Ti completes before it can restart the current statement.

In general, when there are WW conflicting transactions, the transaction T has to wait for all these transactions to complete and then restart the current statement. As mentioned herein, when a statement is restarted, the acquired locks are not released. Thus, the subsequent execution of the statement can more likely succeed.

The following relates to a more complex example that illustrates a WW conflict. To simplify the example, stamps are omitted. Assume that before either T1 or T2 starts that object X has a value of 500, a stamp of TXN1.0.0, and a CTN of 10 as illustrated in the following:
    T1 starts and gets a read timestamp of 15
    T2 starts and gets a read timestamp of 20
    T2 writes (key=X.T2, value=100)
    T2 issues an FDB read with range [X.0, X. Inf]. The set SCT will be empty so T2 continues
    T1 writes (key=X.T1, value=50)
    T1 issues an FDB read with range [X.0, X. Inf]. The set SCT will contain T2 so T1 must restart
    T2 successfully commits. T1's CTN for X will be >20. Assume it is 21
    After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that must be removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes must have completed before a statement may be finalized, and all statements must be finalized before the transaction may be committed.

A transaction is aborted by inserting its Transaction ID into the Transaction Status Table, with its commit timestamp set to a sentinel invalid value to indicate an abort. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., storage platform 104) to avoid taking any read locks.

The basis for this interface is the following statement class:

TransactionResult The transaction manager 440::BeginTransaction(ID);

TransactionResult The transaction manager 440::PrepareTransaction(ID); // Used for 2PC across FDB and FDN TransactionResult The transaction manager 440::CommitTransaction(ID);

TransactionResult The transaction manager 440::AbortTransaction(ID);

class StatementContext {
public:
StatementContext(ID transactionID, int sqlStatementNumber, int restartCount);
Future<Cursor> read(Key key);
Future<Cursor> readRange(Key from, Key to);
Future<void> insert(Key, Value value);
Future<void> update(Key, Value value);
// Equivalent to calling insert( )/update( ) once per item.
Future<void> bulkInsert(std::vector<std::pair<Key, Value>> data);
Future<void> bulkUpdate(std::vector<std::pair<Key, Value>>
Future<void> lock(Key key); // Used for SELECT . . . FOR UPDATE
Future<void> delete(Key key);
// StatementContext "commit"
enum Result {FINALIZED, ABORTED, RESTARTED, DEADLOCKED};
Result finalize( );
private:
ID transactionID;
Private int statementNumber; Private int restartCount=0;
Timestamp readTimestamp;
// Conflict Management Bool hasConflicts( );
Std::vector<Timestamp> getConflictingIDs( );
}

Consider the following example SQL query:
Update emp.Salary=emp.Salary*1.1 where emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

The following discussion relates to a key format in accordance with some embodiments of the subject technology.

In discussions herein, the subject system has been assumed as operating on a potentially infinitely sized key/value pair. However, in some implementations, the subject system utilizes a distributed database (e.g., FoundationDB ("FDB"), and the like), which can impose a set of restrictions e.g., keys must be 10 KB or less, values must be 100 KB or less, a single transaction should not exceed 1 MB (and cannot exceed 10 MB).

In an implementation, the subject system may be subjected to a key size limit (e.g., 10 KB) as part of its API. Further, the subject system supports values that exceed a threshold upper/larger size (e.g., 100 KB), as a single SQL row can be one or more MB in size. This means that the subject system is enabled to split a large value across a number of key/value pairs.

The subject technology, in some embodiments, supports two key formats. Initially all transactions will write keys (e.g., to the key/value store) using the format below:

UserKey, (TxnID, Statement, RestartCount), (Control Bits), (Worker ID, WriteNum), (Part Number, isFinalPart), WriteTs, isCommitEmbedded User Key is the key that the user provided in the call into the subject system.

TxnId, Statement, RestartCount is the stamp associated with the object. Note that RestartCount comprises gsAttemptCount and xpRestartCount.

The Control Bits has three flags in it
An IsLock flag used to indicate that this key should be skipped for reads
An IsTombstone flag used to indicate that a reader should consider the key as absent Worker ID and WriteNum are used to guarantee that a statement (which may be executed on multiple workers in parallel) cannot write duplicate keys.

Part Number is for sharding values across multiple key-value pairs. Values will be split into 100 KB chunks, and each chunk will be written with a sequentially increasing Part Number. This allows for a range scan to concatenate sequential values that have the same (Key, TxnID, Statement, RestartCount, Control Bits) to yield the original value.

IsFinalPart: set to true on the last key for an object.

WriteTs: a generated monotonically increasing timestamp to indicate when a key-value pair is persisted in the database (e.g., FDB and the like). This is used to implement the lock ordering in the subject system.

IsCommitEmbedded: indicate that the commit timestamp is directly embedded in the key If IsCommitEmbedded is set, then the format of the key will be:

User Key, Commit Timestamp, Control Bits, (Part Number, isFinalPart), IsCommitEmbedded The following discussion relates to a transaction status table (TST).

A Transaction Status Table (TST) stores the status of committed, pending, and aborted transactions. In an embodiment, the TST is implemented as a key-value table in a distributed database (e.g., FDB) with a reserved, special name and is maintained per account. The key format, in an example, will be:

(account ID, transaction ID)
In an embodiment, the value format will be:
(status, (<statement, state, restartCount>), commit timestamp)
status: stores the transaction status, including COMMITTED, ABORTED, or PENDING
<statement, state, restartCount>: stores a list of statement numbers, their current states, and the restart counts. Statement states include PENDING, FINALIZED, and ABORTED.
commit timestamp: the final commit timestamp of the transaction. (only for COMMITTED transactions)

The TST is updated whenever a transaction is committed or aborted, or whenever a statement is finalized. In an embodiment, TST updates are implemented using a special compareAndSet operation, instead of blind updates, to ensure that the outcome of a transaction/statement is final once set. For example, if a transaction has already been committed, then aborting it subsequently will become a no-op. This is important to ensure the subject system's correctness in the presence of shadow execution node instances where multiple execution node workers may finalize the same statement concurrently with different restart counts.

Thus, when a statement fails to finalize due to conflicts, it instead writes its conflict set into the database (e.g., the storage platform 104). These conflict sets may be read by all other transactions, allowing them to detect a cycle in the waits—for graph, indicating that they're involved in a deadlock.

Figure 5:
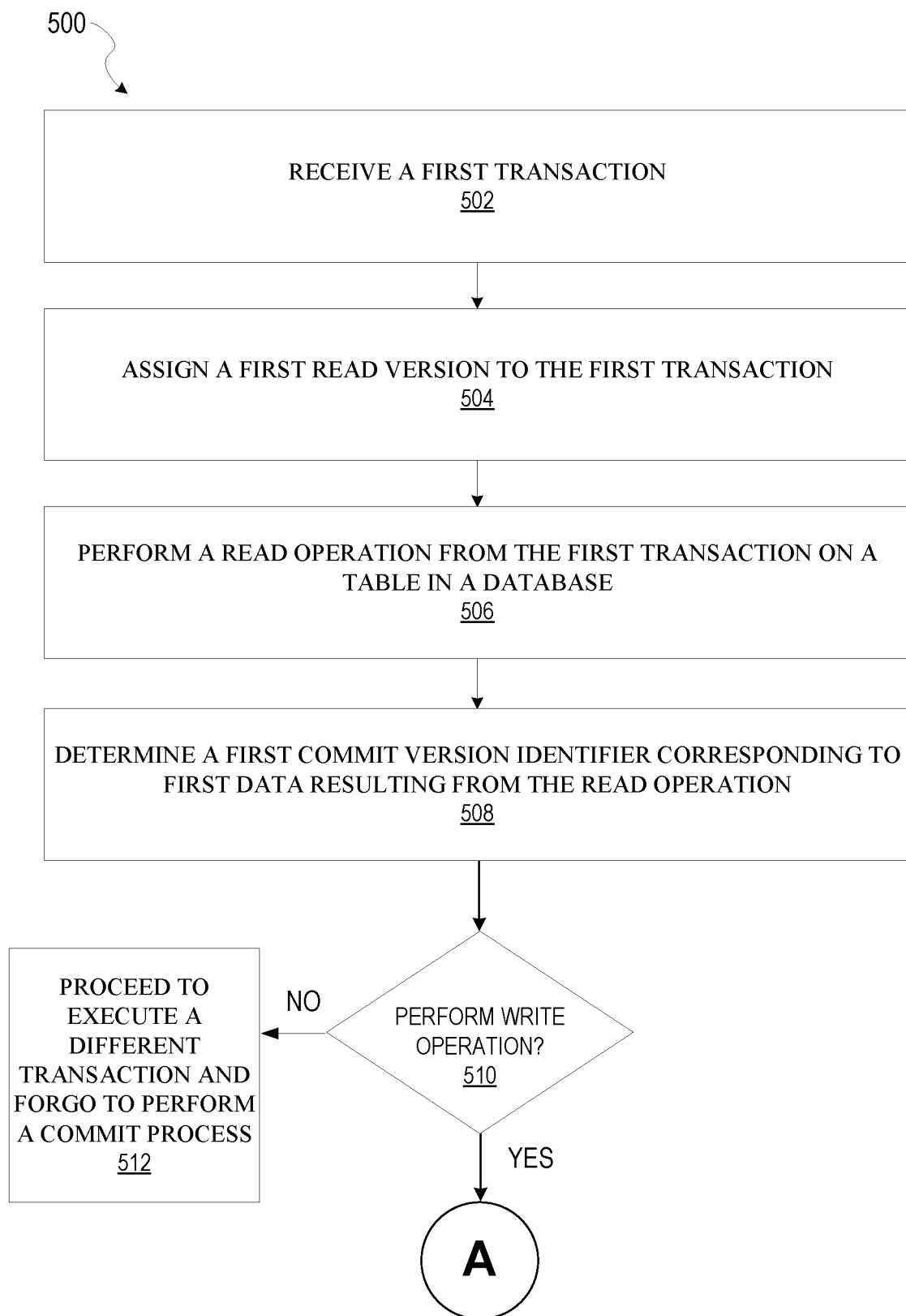
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction, the first transaction to be executed on linearizable storage.

At operation 504, the transaction manager 440 assigns a first read version to the first transaction, the first read version indicating a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with foregoing to perform a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
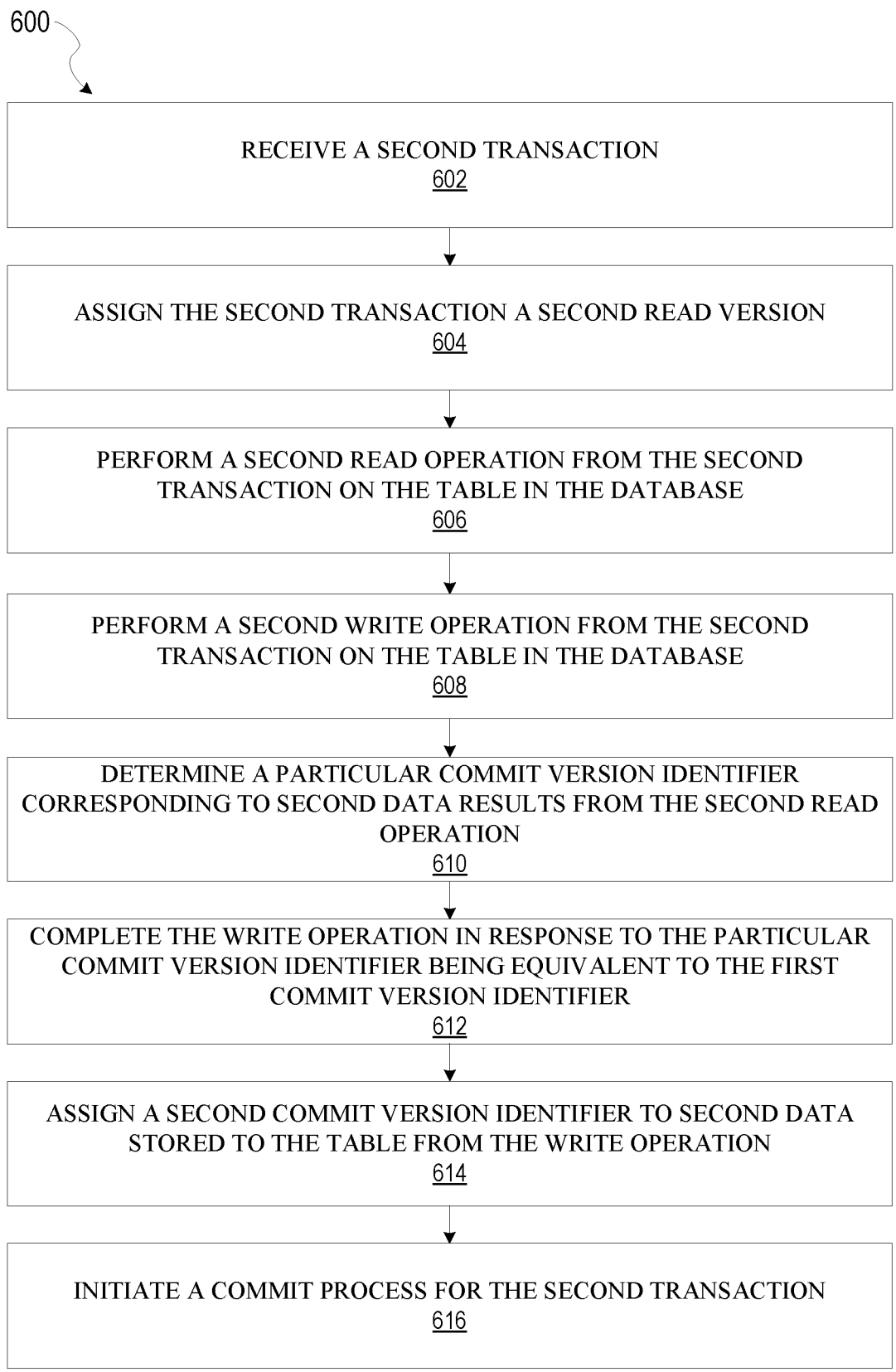
FIG. 6 is a flow diagram illustrating operations of a database system in performing a method, in accordance with some embodiments of the present disclosure.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110.

Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500.

At operation 602, the transaction manager 440 receives a second transaction, the second transaction to be executed on linearizable storage.

At operation 604, the transaction manager 440 assigns the second transaction a second read version, the second read version indicating a second version of the linearizable storage.

At operation 606, the transaction manager 440 performs a second read operation from the second transaction on the table in the database.

At operation 608, the transaction manager 440 performs a second write operation from the second transaction on the table in the database.

At operation 610, the transaction manager 440 determines a particular commit version identifier corresponding to second data results from the second read operation.

At operation 612, the transaction manager 440 completes the write operation in response to the particular commit version identifier being equivalent to the first commit version identifier.

At operation 614, the transaction manager 440 assigns a second commit version identifier to second data stored to the table from the write operation, the second commit version identifier corresponding to a second version of data in the table, the second commit version identifier different than the first commit version identifier.

At operation 616, the transaction manager 440 initiates a commit process for the second transaction.

Figure 7:
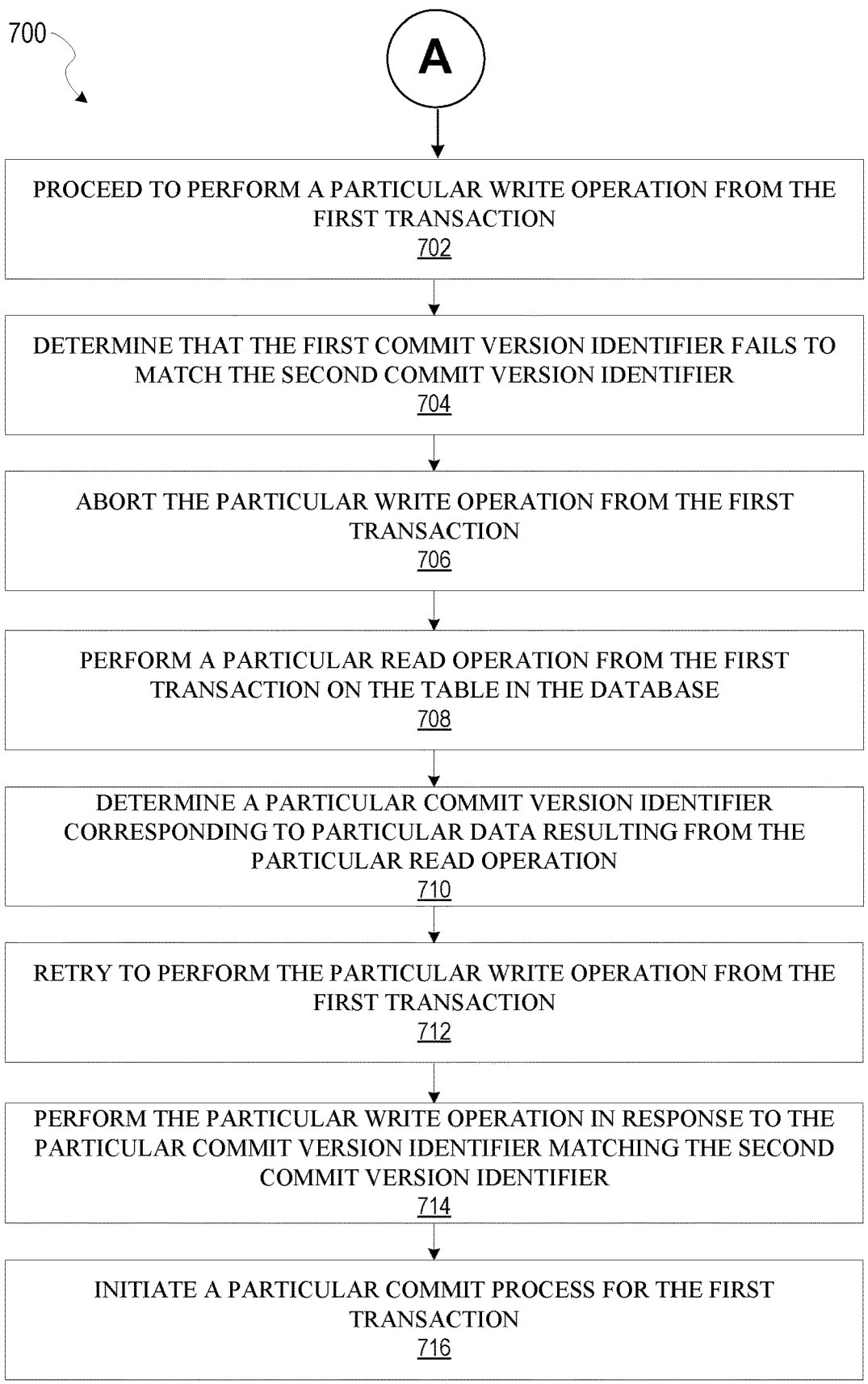
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method).

At operation 702, the transaction manager 440 proceeds to perform a particular write operation from the first transaction.

At operation 704, the transaction manager 440 determines that the first commit version identifier fails to match the second commit version identifier.

At operation 706, the transaction manager 440 aborts the particular write operation from the first transaction.

At operation 708, the transaction manager 440 performs a particular read operation from the first transaction on the table in the database.

At operation 710, the transaction manager 440 determines a particular commit version identifier corresponding to particular data resulting from the particular read operation.

At operation 712, the transaction manager 440 retry to perform the particular write operation from the first transaction.

At operation 714, the transaction manager 440 perform the particular write operation in response to the particular commit version identifier matching the second commit version identifier At operation 716, the transaction manager 440 initiates a particular commit process for the first transaction.

Figure 8:
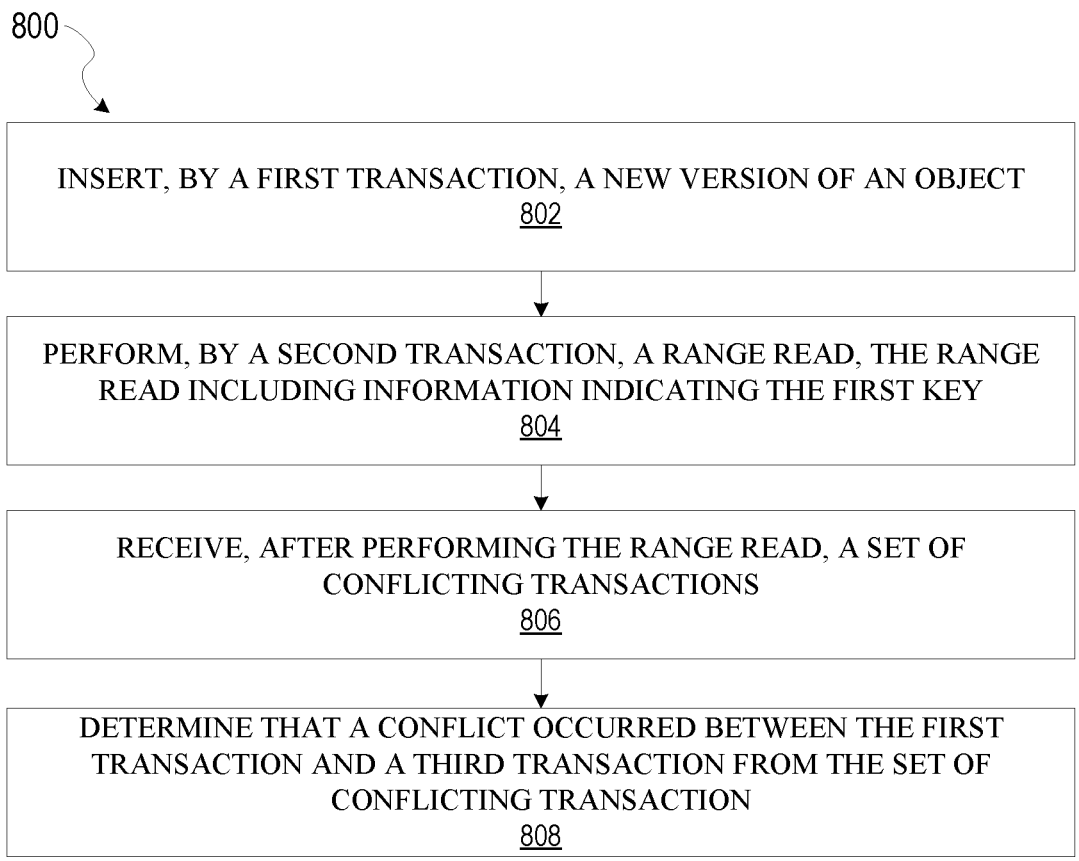
FIG. 8 is a flow diagram illustrating operations of a database system in performing a method, in accordance with some embodiments of the present disclosure.

FIG. 8 is a flow diagram illustrating operations of a database system in performing a method, in accordance with some embodiments of the present disclosure. The method 800 may be embodied in computer-readable instructions for execution by one or more hardware components (e.g., one or more processors) such that the operations of the method 800 may be performed by components of network-based database system 102, such as components of the compute service manager 108 or a node in the execution platform 110. Accordingly, the method 800 is described below, by way of example with reference thereto. However, it shall be appreciated that the method 800 may be deployed on various other hardware configurations and is not intended to be limited to deployment within the network-based database system 102.

At operation 802, the transaction manager 440 inserts, by a first transaction, a new version of an object, the inserting corresponding to a first statement from the first transaction, the first statement including information indicating a first key, a first transaction identifier, a first statement number, and a first restart count. In an example, the first key is appended with the first transaction identifier, the first statement number, and the first restart count. In an example, the set of conflicting transactions comprises a list of committed or active transactions that performed an update operation in a row of a source table prior to the first transaction.

At operation 804, the transaction manager 440 performs, by a second transaction, a range read, the range read including information indicating the first key.

At operation 806, the transaction manager 440 receives, after performing the range read, a set of conflicting transactions.

At operation 808, the transaction manager 440 determines that a conflict occurred between the first transaction and a third transaction from the set of conflicting transaction. In an embodiment, when the transaction manager 440 determines that a fourth transaction from the set of conflicting transactions has committed before a read timestamp of the first transaction, then a conflict between the first transaction and the fourth transaction can be (safely) ignored because the first transaction and the fourth transaction do not have a write-write conflict.

In an embodiment, determining that the conflict occurred between the first transaction and the third transaction comprises determining that the third transaction from the set of conflicting transactions has committed after a read timestamp of the first transaction. In an embodiment, determining that the conflict occurred between the first transaction and the third transaction comprises determining that the third transaction is still active.

In an embodiment, performing a restart of the first transaction occurs in response to determining that the conflict occurred. In an example, performing the restart of the first transaction comprises re-executing a statement from the first transaction as a subsequent execution of the statement from a previous execution of the statement that did not result in a transaction commit.

In an embodiment, prior to re-executing the statement, waiting for a particular conflicting transaction, from the set of conflicting transactions, to complete a commit operation. In an embodiment, re-executing the statement from the first transaction occurs without waiting for a particular conflicting transaction, from the set of conflicting transactions, to complete a commit operation.

The present disclosure relates to systems, methods, and devices for databases and more particularly relates to a fencing mechanism for ensuring that in-flight or executing statements will not be allowed to execute with outdated table metadata.

The networked database system described herein can provide high performance through the different execution modes. In an implementation, those execution modes are (i) single-statement fast-path execution, (ii) single-statement slow-path execution, and (iii) multi-statement transactions' execution. Each statement's workflow consists of the compilation (occurring in GS (global services) corresponding to compute service manager 108) and execution (occurring in XP corresponding to a given execution node) phases. Compilation includes steps taken until a statement's SDL (Storage Definition Language) is generated and transmitted to an XP server (e.g., execution node as described before) for execution. After compilation and prior to initiation of execution, there are additional steps that a statement's SDL goes through, and the time that it might stay in this state is bounded in the order of hours in an implementation.

In an example, a statement's execution includes three phases: (i) initialization, where a read timestamp (GRV) is acquired; (ii) execution, where the DML is reading/writing data; and (iii) finalization, where the statement is either finalized or aborted. At statement startup, a DML statement creates a TST entry, which includes the target tables. During the finalization stage, DMLs will be assigned a commit timestamp (CTS), which is used to persist changes in the data store. The execution time's duration is measured as the time difference between the GRV and CTS retrieval versionstamps. Fast-path execution is a special mode where all the changes of a statement are bundled in a single distributed database transaction. Due to the time-limitations of the distributed database, a statement can use the fast-path only if its execution time is less than ~5 seconds in an implementation.

Figure 9:
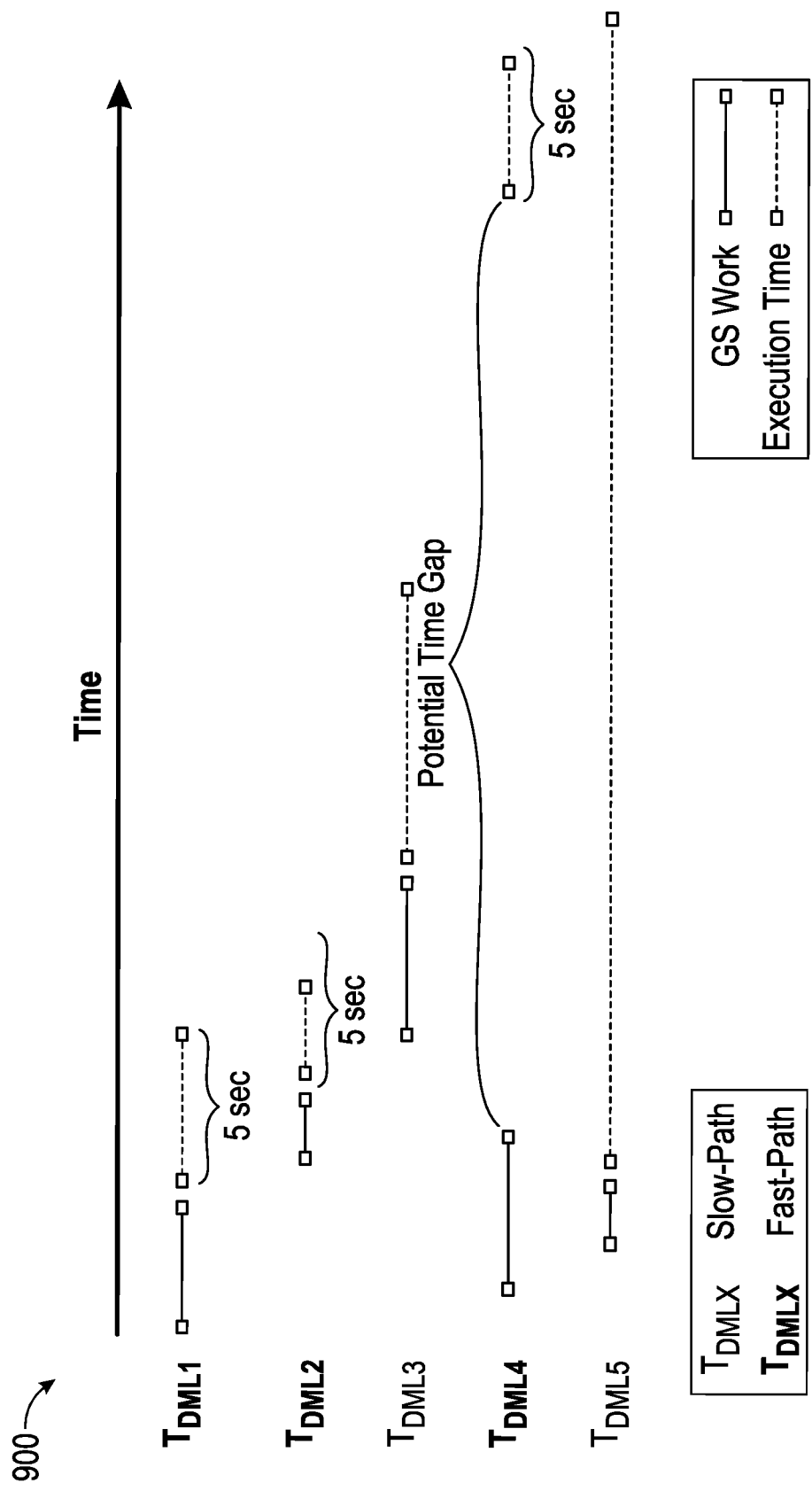
FIG. 9 is a diagram illustrating a time-graph of example steps followed for DMLs executing in different modes, in accordance with some embodiments of the present disclosure.

FIG. 9 is a diagram 900 illustrating a time-graph of example steps followed for DMLs executing in different modes, in accordance with some embodiments of the present disclosure.

As shown, statements $T_{DML1}$, $T_{DML2}$, and $T_{DML4}$ have execution times with a duration of less than 5 seconds. To this end, the aforementioned three transactions can commit their changes using the fast-path execution mode. In contrast, $T_{DML3}$ and $T_{DML5}$ cannot use the fast-path since their execution times last more than 5 seconds. As a result, the aforementioned two transactions will operate using a slow-path execution mode.

Problems can arise when there is a time gap between the end of compilation and the time that a statement initiates execution. $T_{DML4}$ represents this scenario, where a time-gap exists between the end of compilation and beginning of execution. Unless $T_{DML4}$'S execution does not conclude within the job timeout (which is in the order of hours), $T_{DML4}$ is still allowed to execute and commit its changes.

This execution model poses challenges and wrong results emerge in the presence of metadata changes that affect the selected execution plan (e.g., use an index that has been dropped and is not maintained).

The subject technology provides a statement fencing mechanism (e.g., a statement fencing process), which is part of the execution framework. The statement fencing mechanism ensures that statements can be committed only if they are aware of the latest metadata of their target table(s). In essence, cases like $T_{DML4}$ (discussed above) verifies that no metadata changes have been committed, which might compromise data integrity.

When no DDLs take place, statements should not be impacted by the fencing mechanism, both in terms of aborts and performance. However, when a DDL takes place, any statements which (i) have started executing prior to the DDL and (ii) target the affected table should operate on the latest metadata version.

When no DDLs take place, the performance of statements executing within the expected circumstances (e.g., no unavailable components, prolonged idling, idling due to background operations, etc.) remains the same.

Long-running statements on the same table as the one affected by a DDL might experience minimal overhead when the DDL takes place.

Any statement that targets the same table as the DDL and has started executing prior to the DDL, then it should not be affected.

Actively executing statements should not be aborted, if they do not target the same table as the committed DDL.

The statement fencing mechanism is applied during the execution of concurrent statements and DDLs. Hybrid tables are relational tables stored in distributed data stores (e.g., FoundationDB provided by storage platform 104).

In an implementation, the statement fencing mechanism will be applied only on DDLs that require a back-fill mechanism (referred to as a back-fill DDL herein), and will restrict each table to a single active back-fill-DDL operation. In an implementation, each back-fill-DDL registers a table's metadata version (MVT) in a TableDPO (e.g., table data persistence object stored in a metastore corresponding to metadata database 112) and in data FDB (datastore provided by storage platform 104). Each table's MVT is ensured to be increasing, retrieved from a field that tracks a table's version. Each DML statement includes the MVT retrieved from the TableDPO in the SDL (of the DML statement) at compilation time. At DML finalization, the statement will fetch the MVT from the datastore (e.g., provided by storage platform 104), and compare it with the version stored in its SDL. If the MVT version in the SDL is earlier/smaller than the MVT version stored in data FDB, then the statement will have to re-compile.

In order to guarantee that the MVT is stored per-table and does not get deleted by operations such as TRUNCATE, the MVT is stored under a special incarnation number, which will not be affected by TRUNCATE operations. At table creation, no value is going to be added in that path. The first time a back-fill DDL takes place, the prefix will populate the value. As referred to herein, a back-fill DDL is a DDL statement that requires modification of a table's data. DMLs will check whether a value exists under the aforementioned prefix and will only fail when a value exists that is earlier than the MVT value in the SDL.

Figure 10:
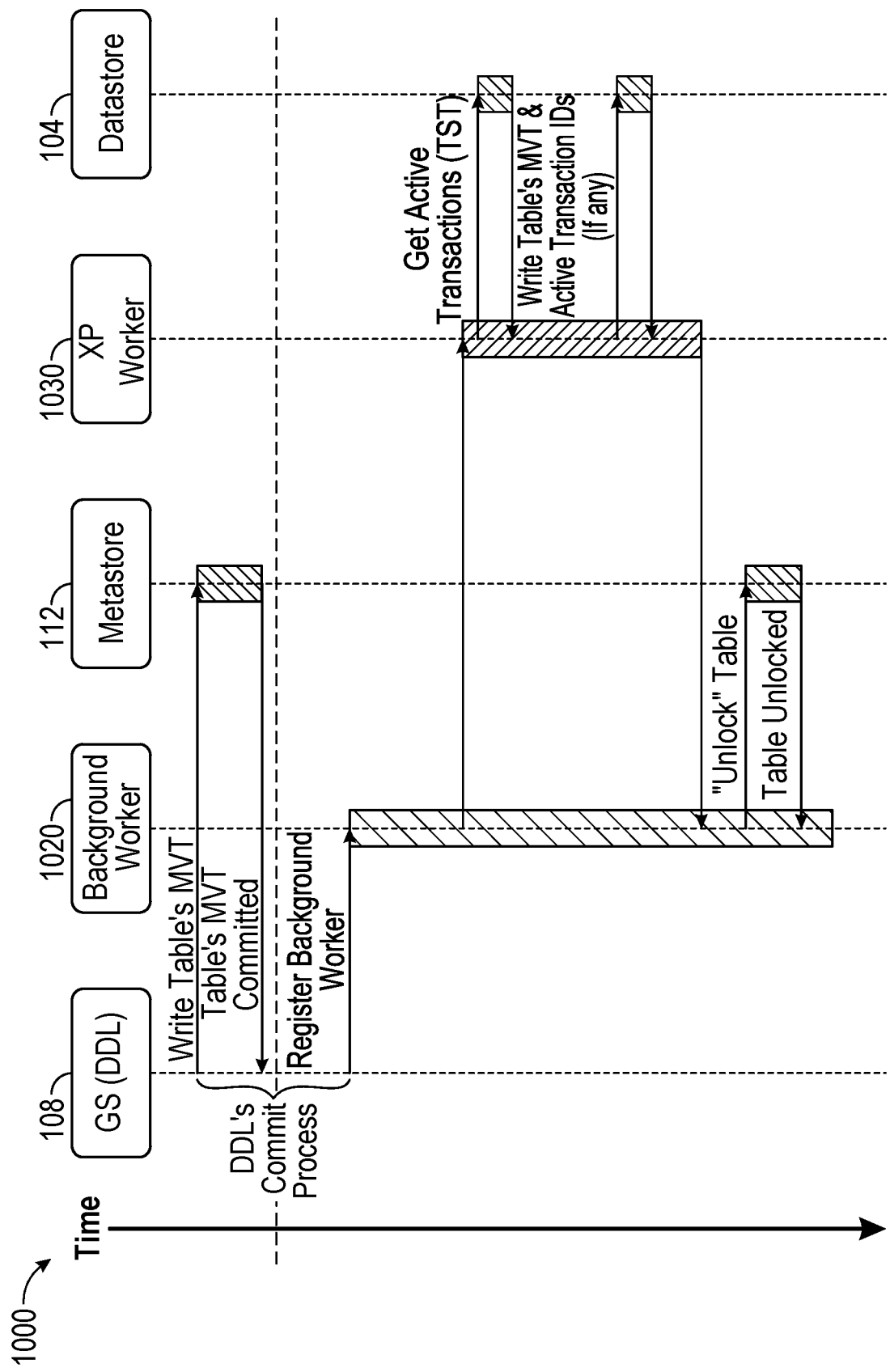
FIG. 10 illustrates an example processing flow for a set of operations of an example transaction involving a fencing mechanism, in accordance with some embodiments of the present disclosure.

FIG. 10 illustrates an example processing flow 1000 for a set of operations of an example transaction involving a fencing mechanism, in accordance with some embodiments of the present disclosure.

A back-fill-DDL updates the table's MVT both in the metastore (e.g., metadata database 112) and in the datastore. The steps followed by the back-fill DDL are described below and as shown in the processing flow 1000 of FIG. 10.

Step 0: Execute DDL's Steps Using Compute Service Manager 108—and Store the New Table MVT in the Metastore (e.g., Metadata Database 112).

In an implementation, compute service manager 108 performs operations for the back-fill-DDL as illustrated in the example of FIG. 10. The compute service manager 108 (e.g., executing operations for the back-fill DDL) reflects (e.g., by performing write operation(s)) the new table's MVT in the TableDPO (e.g., stored on metastore provided by metadata database 112).

As part of a commit (e.g., request to perform a commit operation of a table associated with a transaction), compute service manager 108 registers a background worker 1020, which triggers an XP operation(s) on a given execution node (e.g., execution node 302-1), similar to using a background process to trigger a compaction process to be performed on a given execution node. This background XP operation reflects (e.g., by performing write operation(s)) the table's new MVT, and any active transaction IDs, which target the same table, in the datastore (e.g., provided by storage platform 104).

In the event that the metastore (e.g., metadata database 112) is unavailable, or another error occurs (e.g., instance failure of compute service manager 108), then the metadata DDL framework handles rolling back the metadata changes in an implementation.

Step 1: Background Worker to Commit the New Table MVT in the Datastore.

As further shown, a background worker 1020 (e.g., initiated by fencing manager 240 provided by compute service manager 108) triggers an XP worker 1030 (e.g., executing on a given execution node such as execution node 302-1), which will perform operations for an XP job that includes (i) reflecting the new table MVT and (ii) gathering any active transaction IDs (targeting the same table) in the datastore. In more detail, the XP job retrieves the committed table's MVT value stored in the datastore ($MVT_{DS}$) (if any). If an earlier one, the same one, or no value exists, then the XP job writes the new value created by the back-fill-DDL. If a more recent value exists, then the XP job does not write any values and completes with an error code, which indicates that the back-fill-DDL's changes cannot be completed.

Depending on the back-fill DDL's semantics, the XP worker 1030 can utilize the information of active transactions, which have started prior to the DDL (e.g., retrieved a GRV), on the same table. In an example, a set of transaction IDs of the active transactions are harvested by scanning the TST table and can be stored along with the new MVT. Those IDs are utilized to allow the completion of the active transactions prior to executing the next steps of the back-fill DDL. After the XP job completes successfully, a GS driver (e.g., provided by compute service manager 108) updates a flag in the table's TableDPO (stored in metastore provided by metadata database 112) to reflect that a fence (e.g., for the statement fencing mechanism) has been set successfully.

In the event that the metastore is unavailable, or another error occurs (e.g., instance failure of compute service manager 108), the XP background job will re-execute. Re-execution does not cause any issues, as the XP job reads the table's MVT value before writing to it.

In the event that the MVT value stored in the datastore is more recent, the XP background job returns an error code. The error code indicates that the DDL's changes cannot go through, and it has to be retried.

Figure 11:
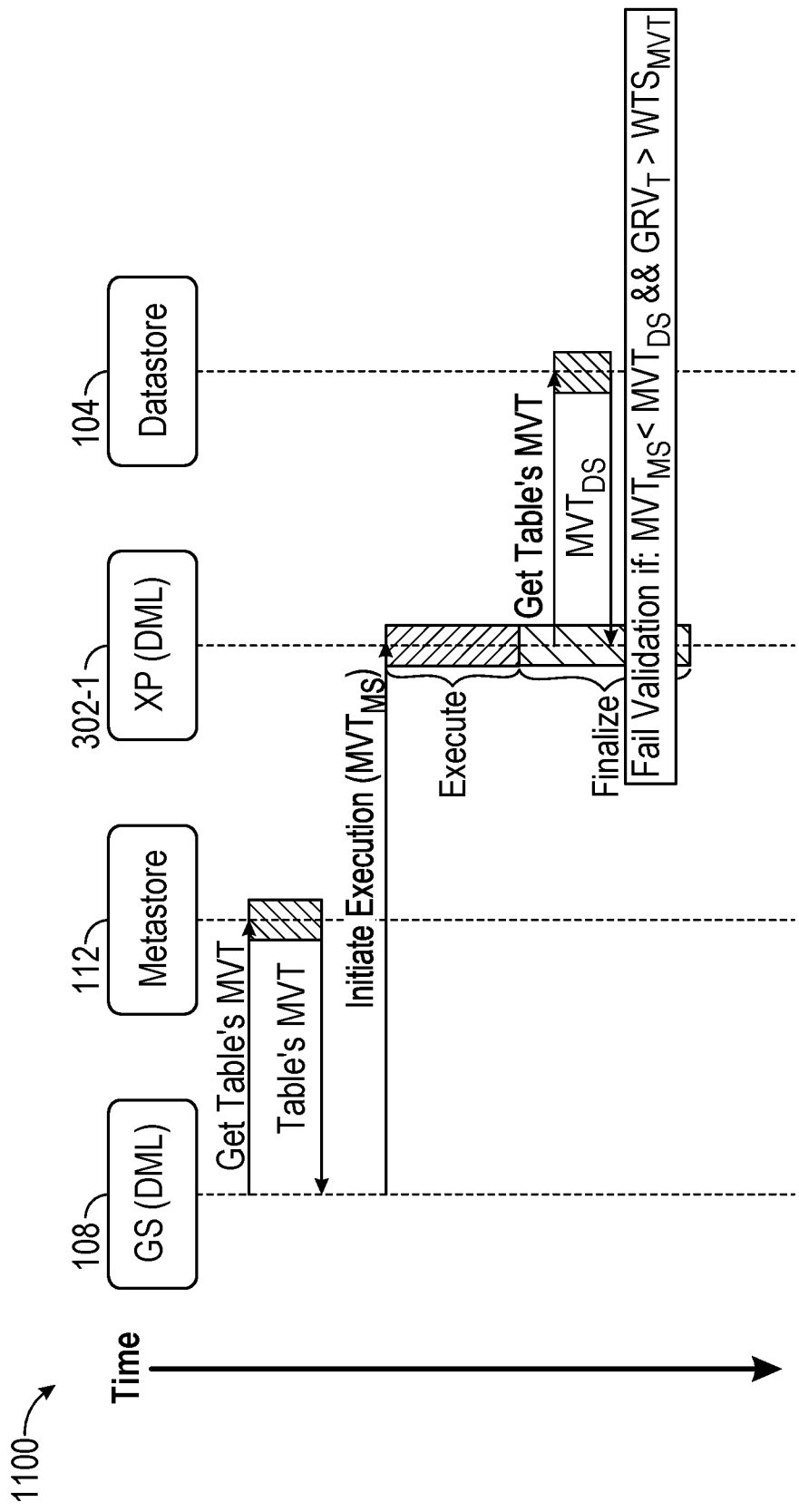
FIG. 11 illustrates an example processing flow for a set of operations of an example transaction involving a fencing mechanism, in accordance with some embodiments of the present disclosure.

FIG. 11 illustrates an example processing flow 1100 for a set of operations of an example transaction involving a fencing mechanism, in accordance with some embodiments of the present disclosure.

In the example of FIG. 11, the statement fencing mechanism adds a validation step into statement finalization. As shown, compute service manager 108 retrieves the table's MVT (e.g., corresponding to the statement that underwent a commit operation in FIG. 10). The validation phase includes comparing a statement's MVT stored in the SDL ($MVT_{MS}$), which is read from the table's TableDPO (metastore), with the MVT read from the datastore ($MVT_{DS}$). As shown, compute service manager 108 initiates execution of the validation phase (e.g., validation process) by providing the statement's MVT to the execution node (e.g., execution node 302-1). The execution node retrieves the table's MVT from the datastore provided by storage platform 104.

In the example of FIG. 11, the validation fails if $MVT_{MS} < MVT_{DS}$ and the statement's GRV ($T_{GRV}$) is older than the MVT's write timestamp ($T_{GRV} >= WTS_{MVT}$). If an $MVT_{DS}$ is not found or the $MVT_{DS} = <MVT_{MS}$, then the statement can proceed. If the validation step fails, then the statement needs to be aborted and re-compiled.

In the event that no value $MVT_{DS}$ is found, which can happen after a truncate or if there has been no committed back-fill-DDL. In this case, a DML statement considers that validation succeeded and proceeds with the finalization phase.

In summary, embodiments of the statement fencing mechanism ensures that no statements, which are unaware of the metadata changes, will be able to finalize. The statement fencing mechanism can guarantee that any statement, which started after the MVT increase, attempting to finalize, with an $MVT_{SDL}$ that is different from the MVT committed by the DDL, will have to re-compile.

Figure 12:
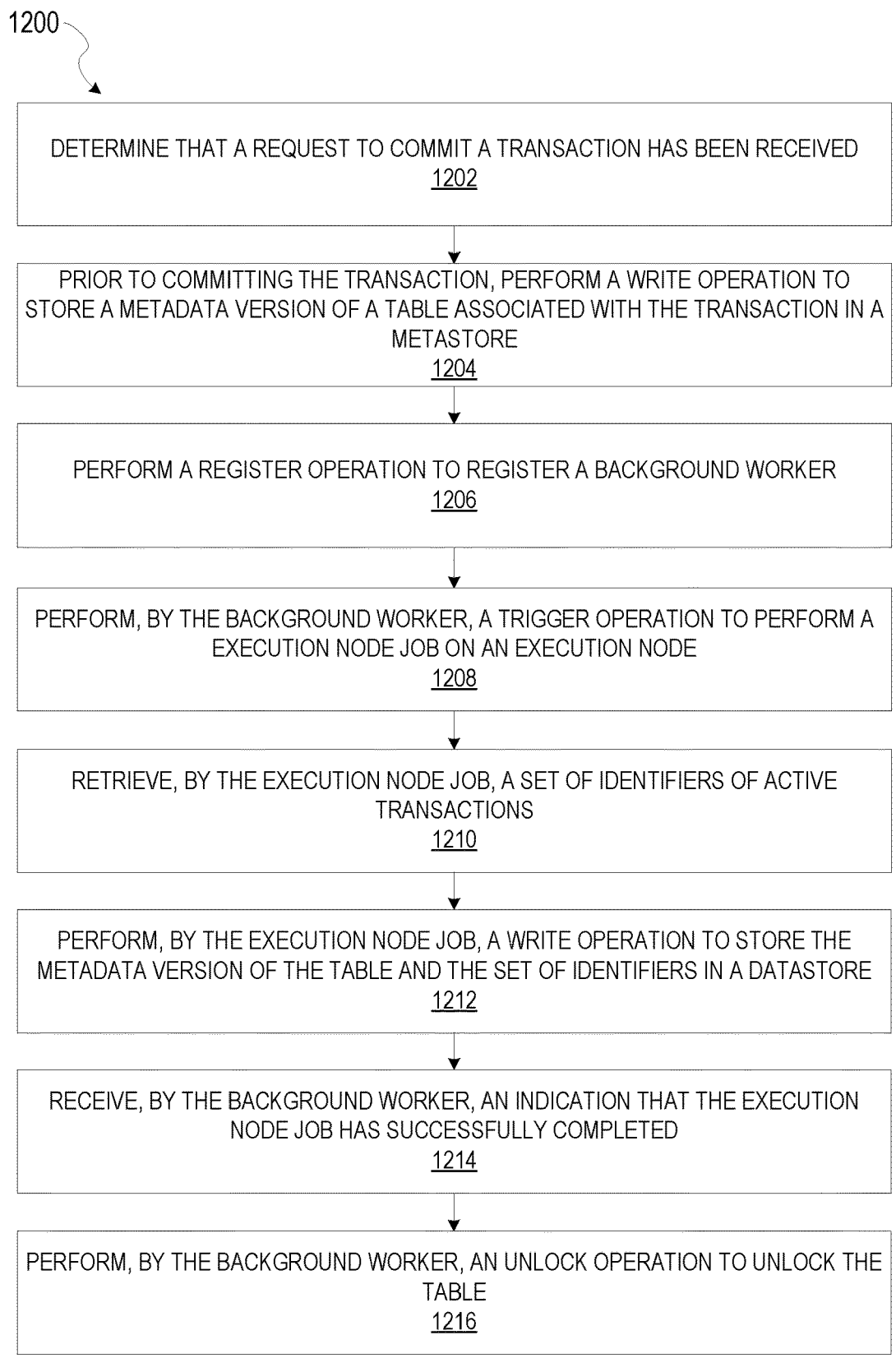
FIG. 12 is a flow diagram illustrating operations of a database system in performing a method, in accordance with some embodiments of the present disclosure.

FIG. 12 is a flow diagram illustrating operations of a database system in performing a method, in accordance with some embodiments of the present disclosure. The method 1200 may be embodied in computer-readable instructions for execution by one or more hardware components (e.g., one or more processors) such that the operations of the method 1200 may be performed by components of network-based database system 102, such as components of the compute service manager 108 or a node in the execution platform 110. Accordingly, the method 1200 is described below, by way of example with reference thereto. However, it shall be appreciated that the method 1200 may be deployed on various other hardware configurations and is not intended to be limited to deployment within the network-based database system 102.

At operation 1202, compute service manager 108 determines that a request to commit a transaction has been received.

At operation 1204, compute service manager 108 prior to committing the transaction, performs a write operation to store a metadata version of a table associated with the transaction in a metastore (metadata database 112).

At operation 1206, compute service manager 108 performs a register operation to register a background worker (e.g., background worker 1020).

At operation 1208, background worker 1020 performs a trigger operation to perform an execution node job on an execution node (e.g., execution node 302-1).

At operation 1210, execution node 302-1 retrieves, by the execution node job, a set of identifiers of active transactions.

At operation 1212, execution node 302-1 performs, by the execution node job, a write operation to store the metadata version of the table and the set of identifiers in a datastore.

At operation 1214, background worker 1020 receives an indication that the execution node job has successfully completed.

At operation 1216, background worker 1020 performs an unlock operation to unlock the table.

In an implementation, the metastore comprises a metadata database, and the datastore comprises a distributed database provided by a storage platform.

In an implementation, performing the register operation is performed by a compute service manager.

In an implementation, the execution node job comprises a statement fencing process.

In an implementation, the statement fencing process is performed by an execution node worker.

In an implementation, execution node 302-1, prior to performing, by the execution node job, the write operation, retrieves a particular metadata version of the table in the datastore, determines that the particular metadata version of the table is an earlier version, a same version, or no value exists for the particular metadata version in the datastore.

In an implementation, execution node 302-1, prior to performing, by the execution node job, the write operation, retrieves a particular metadata version of the table in the datastore, determines that the particular metadata version of the table is a later version than the metadata version of the table associated with the transaction in the metastore, completes the execution node job without performing the write operation to store the metadata version of the table and the set of identifiers in the datastore, and provides a particular indication that the execution node job completed with an error.

In an implementation, execution node 302-1, after retrieving the set of identifiers of active transactions, waits until each active transaction associated with the set of identifiers has completed.

In an implementation, compute service manager 108, after receiving the indication that the execution node job has successfully completed, updates a flag in the metastore indicating that a fence has been set successfully for the table In an implementation, execution node 302-1 performs a validation process based on comparing a first metadata version stored in a table persistence object of the table in the metastore with a second metadata version of the table from the datastore.

In some implementations, secondary indexes (e.g., stored in a FDB-backed datastore, which aids in performing lookups on non-PK (non-primary key) columns efficiently) are a salient feature for expedited lookups, and constraint enforcement. However, an online process for initiating an index build may not be provided, which can require customers or users to recreate tables and experience update downtime.

Moreover, existing approaches can require (i) table locks in order to impose a guarantee that concurrent DMLs will not introduce inconsistencies, (ii) small downtime in order to propagate remaining writes that are not back-filled to a new index, and (iii) a single writer node and multiple readers.

Embodiments of the subject system, as described further below, enable support of online index build. Further, the subject system advantageously (i) does not require table locks to initiate the process, (ii) does not introduce any down-time for concurrent DML and select statements, and (iii) does not assume a single writer node (as the subject system architecture allows writes from multiple virtual warehouses).

Non-unique and Unique indexes are supported for hybrid tables and can be used for foreign-key and unique constraint enforcement. However, to avoid having to stop applications in order to create indexes, an online index building (IB) mechanism is described herein. This mechanism will:

1. Not block concurrent operations on a hybrid table (e.g., disrupt availability).
2. Be transactionally consistent.
3. Not disrupt DMLs/Transactions that have started execution prior to the IB mechanism.

The following discussion relates to constraints, which define integrity and consistency rules for data stored in tables.

In the subject system, constraints can include the following properties:

1. {VALIDATE, NOVALIDATE}: Indicates if a constraint has been validated or not. This entails whether a table's existing data uphold the constraint.
2. {ENFORCED, NOT ENFORCED}: Indicates whether DMLs executing after the constraint has been introduced will uphold new values' validity.
3. {ENABLE, DISABLE}: Similar to ENFORCED, but used in combination with VALIDATE. Controls whether DMLs, which execute after the constraint has been introduced, will fail if the values that they try to modify result in a constraint violation.
4. {RELY, NORELY}: Indicates whether the constraint is enforced via its index, so that the index can be used for rewrites.

The following discussion relates to starting an index build process.

The IB mechanism is triggered when one of the following DDL commands are issued:

CREATE INDEX <index> (<columnX>[, <columnY>]) ON<table> (1)

ALTER TABLE <table> ADD constraint <constraint>{UNIQUE|FOREIGN KEY} (2)

In an implementation, indexes used for a unique or foreign-key constraint arecreated with statement (2) above and secondary indexes arecreated with statement (1) above. The associated constraint will be created as ENFORCED, ENABLE, NOVALIDATE, and NORELY. At the same time, the ALTER TABLE . . . ADD CONSTRAINT statements are not allowed to execute with a different combination of values for those flags. When the IB process completes the validation successfully, the constraint's flags VALIDATE and RELY are set. The IB mechanism does not change the values for ENFORCED, ENABLE. If the IB process cannot validate the constraints, then a user has to vet data and remove records that violate the constraint, drop the corresponding constraint, and then re-try the IB process. Optionally, a validate mechanism can be enabled by enhancing the ALTER TABLE . . . MODIFY CONSTRAINT . . . VALIDATE command to perform an asynchronous validation process.

In an implementation, index being built appears in SHOW INDEX's output, and will have two additional columns: (i) STATUS and (ii) MESSAGE. The STATUS indicates the phase that the index is at, and the MESSAGE contains additional information relevant to the status. In an implementation, STATUS is ACTIVE for indexes.

The IB mechanism is stopped when one of the following DDL commands are issued:

DROP INDEX <index> ON<table> (3)
ALTER TABLE <table> DROP constraint <constraint> (4)

In Statement (4), the constraint can be either a unique or foreign key constraint.

Figure 13:
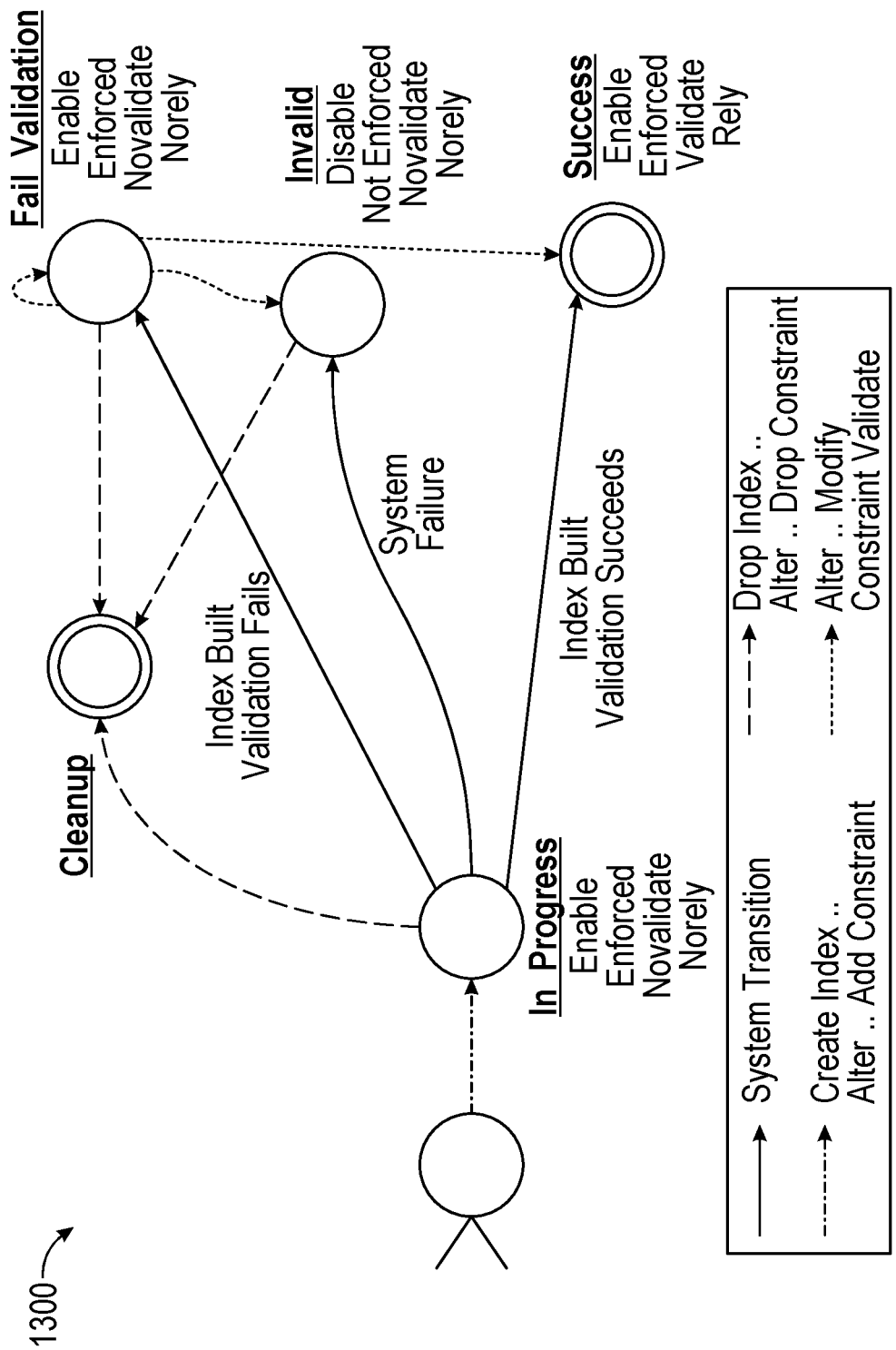
FIG. 13 illustrates a diagram of examples of state transitions for operations performed in connection with an online index, in accordance with some embodiments of the subject technology.

FIG. 13 illustrates a diagram 1300 of examples of state transitions for operations performed in connection with an online index build, in accordance with some embodiments of the subject technology.

As shown in the example of FIG. 13, if at any point, while IB is in-progress, a failure occurs, then the IB process concludes and ends up in the INVALID state. If the index is built, but validation fails, then the IB process concludes in the FAIL_VALIDATION state. If the user wishes to retry the validation process, they have to remove the conflicting records, and submit an ALTER TABLE . . . MODIFY CONSTRAINT . . . SET VALIDATE statement to retry the validation phase. If the index is built and validation succeeds, then the IB transitions to the SUCCESS state. If a user wishes to stop IB, or IB ends up in INVALID or FAIL_VALIDATION and the user does not wish to fix conflicting records, then the user has to submit any of the statements (3) or (4) to transition to the CLEANUP state.

The following discussion relates to the impact on concurrent DMLs and transactions.

Any DML that has not started executing in XP before the IB's DDL is committed, will have to re-compile.
All active transactions and executing statements, which initiated execution prior to the IB's DDL commit, will be allowed to terminate.
The IB process will not complete before all statements/transactions, which initiated prior to the DDL being committed, do not finalize/commit/rollback.

The following discussion relates to example requirements for the IB process.

The base table is available during the IB process.
A user needs ALTER table permissions on the base table to initiate the IB process.
Correctness of data should be preserved. This entails that when an IB concludes successfully, the index should be complete and up-to-date with the latest data. In addition, if a constraint relies on the index, then its properties are set accordingly (e.g., ENFORCED, ENABLED, VALIDATE, RELY).
If any constraints cannot be validated, then their metadata should reflect that change (e.g., set to NORELY, NOVALIDATE). A user is responsible for vetting data, dropping the constraint, and restarting either just the validation or the whole IB process.
IB should be recoverable and if any errors occur during the process, the base table's data consistency should not be compromised.

The following discussion relates to example restrictions in an implementation for the IB process:

1. Only one IB operation can take place per table.
2. The new index being built is not used to retrieve data, until (i) IB concludes and (ii) validation is successful (optional).
3. If the index is used to satisfy a UNIQUE or FOREIGN KEY constraint, then the constraints are not validated and cannot be relied on before IB completes successfully.
4. Except from DDL statements (3)/(4) for the index being built, no other DDL operations (requiring a back-fill operation) are allowed on the table while the IB process is active. This entails that they fail with an informative message until the IB process completes.
5. TRUNCATE operations are blocked while the IB operation is active (i.e., fail with an informative message until the IB process concludes).
6. While an index is being built, no compaction can take place for the target index.

The following discussion relates to operations performed in an example process for IB, which includes the following phases:

1. Phase 1: Commit new Index and wait until active transactions complete.
2. Phase 2: Back-fill Index's data
3. Phase 3: Validate Index (optional based on the index type)

The following discussion relates to Phase 1 of the IB process mentioned above.

The first phase commences when a (1) or (2) statement is submitted (as discussed above). In this phase, the session thread that received the DDL (denoted as TDDL) (i) reflects the intention to initiate the IB process in the metadata, and (ii) notifies all DMLs of the new index that will be built. (i) ensures that no other DDL operation will take place on the base table, and that all DMLs will be aware of the new index, and (ii) ensures that all changes will be reflected to the new index, and the new index will be in-sync with the base table. In an example, the logical steps of TDDL are:

1. Validate that the index can be created (e.g., no index with the same name exists, the columns can be used as part of the index, no other index is being built, and the like).
2. Commit a TableDPO index record with status BUILD_P1 in the main metastore (e.g, provided by metadata database 112). Update the base table's TableDPO to block other DDL operations and truncate operations.
3. Invoke the statement fencing protocol (e.g., statement fencing mechanism discussed previously) to create a statement fence, in order to prevent any future changes committing without being aware of the latest table's metadata. The fence guarantees that all statements that are not aware of the index (and have not initiated execution) will have to re-compile.
   a. After the fence is posted, the XP worker (e.g., XP worker 1030) scans the TST table and gathers all the active transactions, which target the same table. Those transactions are stored and until those are concluded, the IB will not proceed to the next phase.

In the case of an index created for a constraint (either foreign-key or unique), then the constraint's properties are set to: NOVALIDATE, ENFORCED, NORELY, ENABLE. This entails that new DMLs will check whether the foreign-key or unique constraint is upheld on updates (e.g., ENFORCED, ENABLE). The constraint is considered validated and reliable only if the IB process completes successfully (e.g., RELY, VALIDATE).

In an implementation, SELECT and DML statements cannot use the index for scanning the table. All DMLs compiled after the index's metadata are committed, will populate the index with their updates. Deletes to the index being built are supported by using a function call that allows deleting records that do not exist.

The following discussion relates to Phase 2 of the IB process mentioned above.

In this phase, the back-filling process is scheduled. If any transactions were identified in BUILD_P1 as active when the IB was committed, then IB waits before it commences BUILD_P2 until all identified transactions conclude. The status of those transactions is checked at the beginning of BUILD_P2, and if any transactions are found to be still active, then the backfill phase suspends and retries later.

During this phase, a background job (e.g., performed by a background worker or background process initiated by online indexer 242) is responsible for creating an index record for every record in the base table. This process is similar to using a background process to trigger a compaction process to be performed on a given execution node, but the process needs to guarantee that it will not overwrite newer versions of the index (e.g., guarantee that IB's backfilling thread will not commit a version of an index record that overwrites a more recent version). Writes of the back-fill (denoted as $T_{BIB}$) are written using an older version timestamp (e.g., the version-stamp used for statement fencing's table MVT). In this manner, $T_{BIB}$'S writes are done using an earlier version stamp and are conflict-free.

The following discussion relates to Phase 3 of the IB process mentioned above.

The index is scanned to check the uniqueness or referential integrity validity of index records. If the uniqueness or ref. integrity is not guaranteed, then the IB operation results in the FAIL_VALIDATION state. The failure is reflected in the SHOW INDEX entry for the index. In addition, the constraint associated with the index remains as NOVALIDATE, NORELY. If the new index is validated, then the associated constraint can be marked as VALIDATE and RELY and the IB process results in the SUCCESS state.

For validation, the IB process initiates a scanner thread (named $T_{VAL}$) that goes over the index and verifies the validity of all records in the unique/foreign-key index. $T_{VAL}$ receives a GRV when it initiates execution in XP (e.g., execution node). If the index's snapshot at GRV is validated, then all future states of the index are going to be valid, since all future DMLs have to verify the correctness of the records that they introduce. As a result, if $T_{VAL}$ validates the snapshot, then the new index will be in the validated state.

The following discussion relates to a unique index. In an example, the index is scanned to verify that all keys are unique. In detail, $T_{VAL}$ scans records and verifies that all records are unique in the index range.

The following discussion relates to foreign key index. In an example, $T_{VAL}$ scans the index and the referenced index. After $T_{VAL}$ reads all records of the new index, $T_{VAL}$ verifies that all the referenced keys exist in all the referenced tables.

Figure 14:
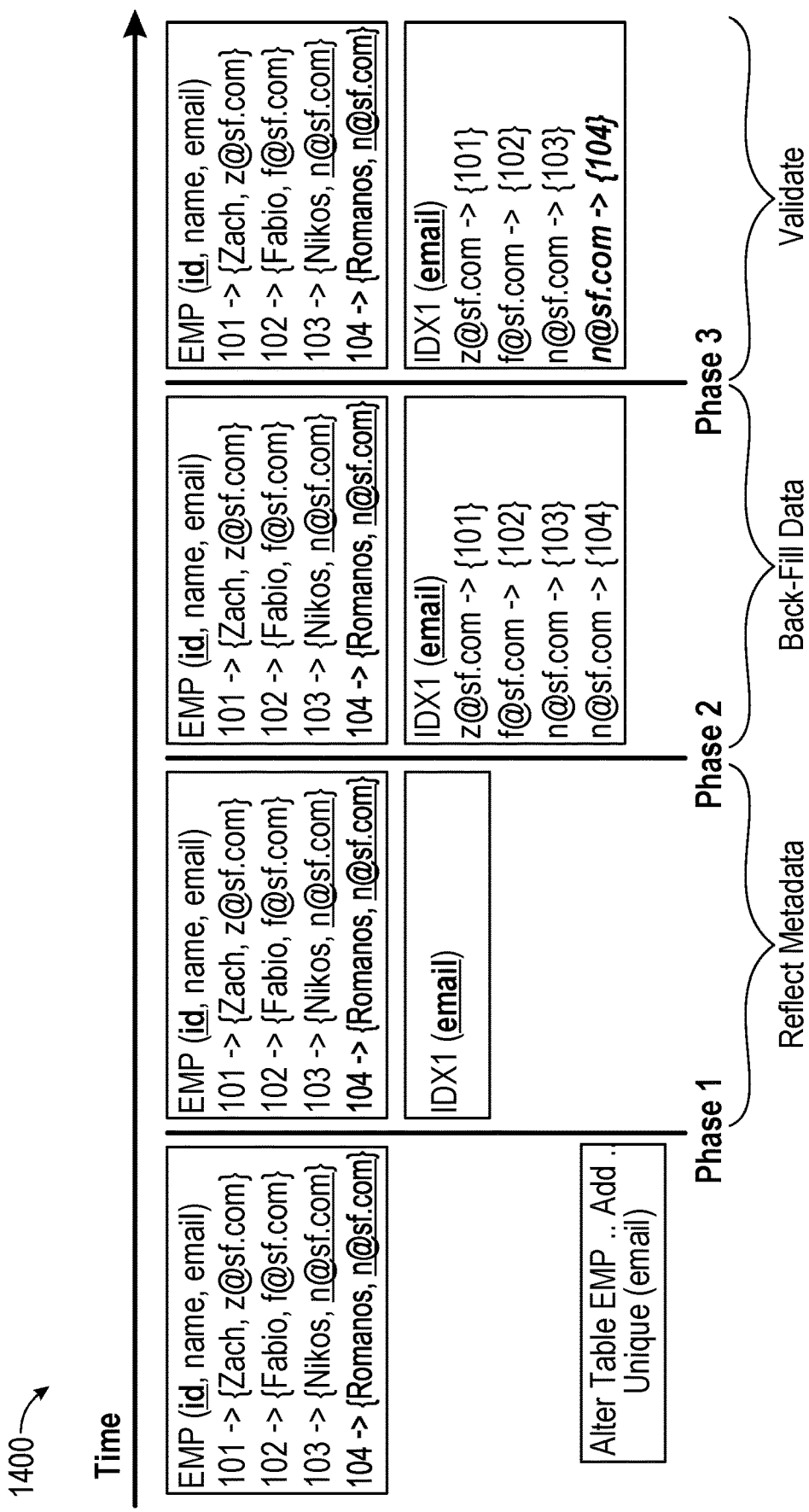
FIG. 14 illustrates examples of various phases of an online index build, including data included in a table and an online index, in accordance with some embodiments of the subject technology.

FIG. 14 illustrates examples of various phases 1400 of an online index build, including data included in a table and an online index, in accordance with some embodiments of the subject technology.

In the example of FIG. 14, a DDL command (e.g., statement for altering data with a unique constraint for some of the data) is performed on a given hybrid table (e.g., table EMP corresponding to a table for employees that includes three columns of data corresponding to an employee identifier, name, and email, where the email column has a unique constraint based on the DDL command) are shown.

As further illustrated, in Phase 1 (e.g., first phase) of an online index building process, a new index is reflected in metadata and online indexer 242 waits until all open transactions, which are unaware of the index and started prior to the new index, complete (e.g., when pending transactions conclude).

After all open transactions have completed, the online index building process transitions to Phase 2, and online indexer 242 performs operation(s) to back-fill data for the index.

After the back-fill of the index's data has completed, online indexer 242 performs validation of the index. In this example, validation of the index indicates that the email "n@sf.com" is not unique, and causes the validation to fail. In this scenario, the user can fix conflicting records to resolve the validation failure. Alternatively, an indication that validation has failed can be provided.

Figure 15:
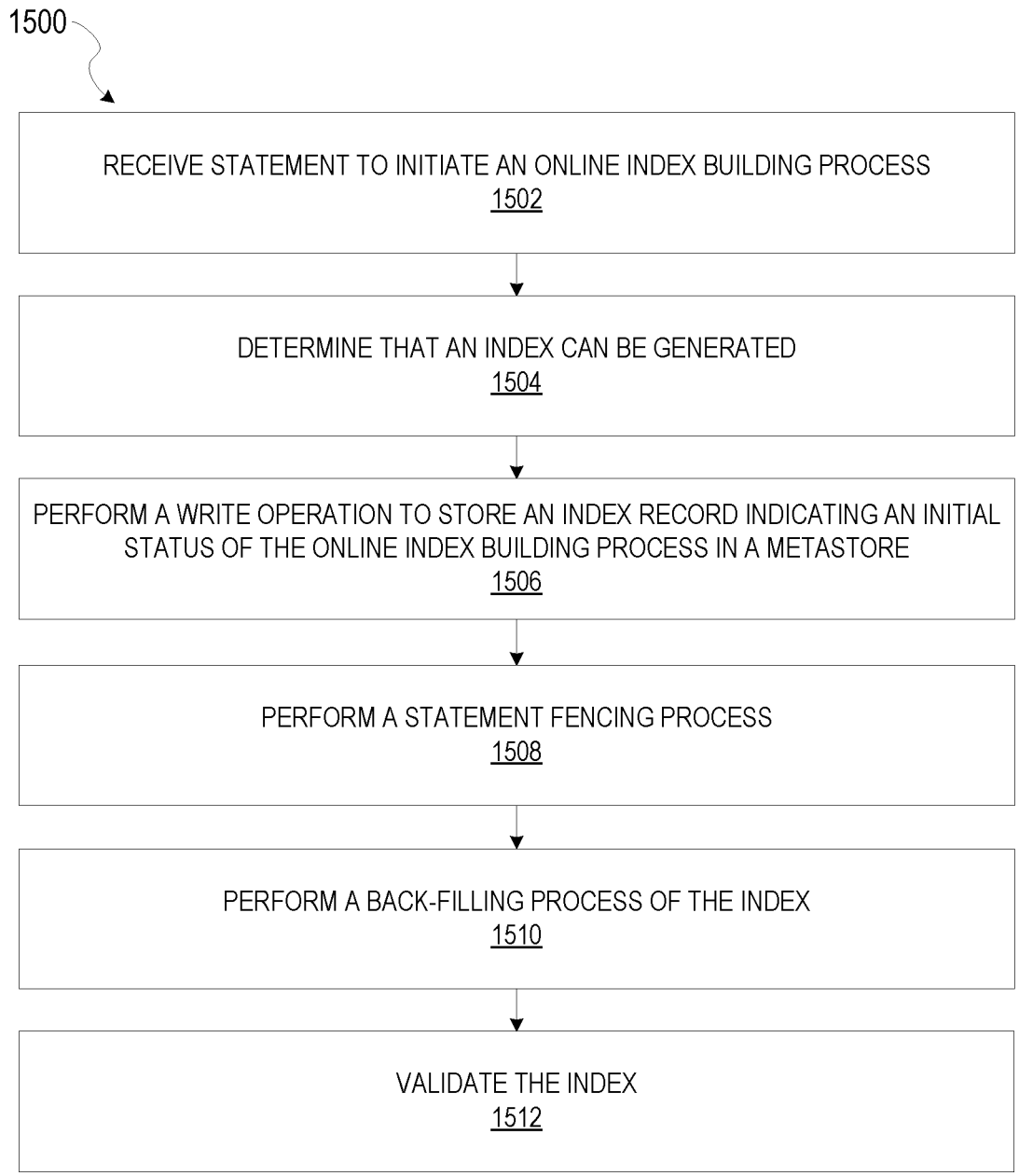
FIG. 15 is a flow diagram illustrating operations of a database system in performing a method, in accordance with some embodiments of the present disclosure.

FIG. 15 is a flow diagram illustrating operations of a database system in performing a method, in accordance with some embodiments of the present disclosure. The method 1500 may be embodied in computer-readable instructions for execution by one or more hardware components (e.g., one or more processors) such that the operations of the method 1500 may be performed by components of network-based database system 102, such as components of the compute service manager 108 or a node in the execution platform 110. Accordingly, the method 1500 is described below, by way of example with reference thereto. However, it shall be appreciated that the method 1500 may be deployed on various other hardware configurations and is not intended to be limited to deployment within the network-based database system 102.

At operation 1502, compute service manager 108 receives a statement to initiate an online index building process of an index.

At operation 1504, determines that the index can be generated

At operation 1506, compute service manager 108 performs a write operation to store an index record indicating an initial status of the online index building process.

At operation 1508, an execution node (e.g., XP worker 1030 on execution node 302-1) performs a statement fencing process.

At operation 1510, a background worker (e.g., background worker 1020) performs a back-filling process of the index.

At operation 1512, compute service manager 108 (e.g., scanner thread) validates the index.

In an implementation, the statement comprises a particular statement to create an index.

In an implementation, the statement comprises a particular statement to alter a table with a constraint.

In an implementation, the constraint comprises that a set of values of a key is unique within the table.

In an implementation, the constraint comprises a foreign key referencing a primary key or unique key of a second table, the second table being different than the table.

In an implementation, determining that the index can be generated comprises: determining that a second index with a same name as the index does not exist; and determining that another index is not currently being generated.

In an implementation, performing the write operation to store the index record comprises: updating a table persistence object corresponding to a table in a metadata database, the updating blocking other operations that modify the table while the online index building process is occurring.

In an implementation, performing the back-filling process of the index comprises: creating, by a background job, a particular index record for each record in a table, the particular index record being included as part of the index.

In an implementation, validating the index comprises: performing a scan of the index to check uniqueness or referential integrity validity of each index record.

In an implementation, a scanner thread is initiated that goes over the index and verifies validity of each index record in the index.

Figure 16:
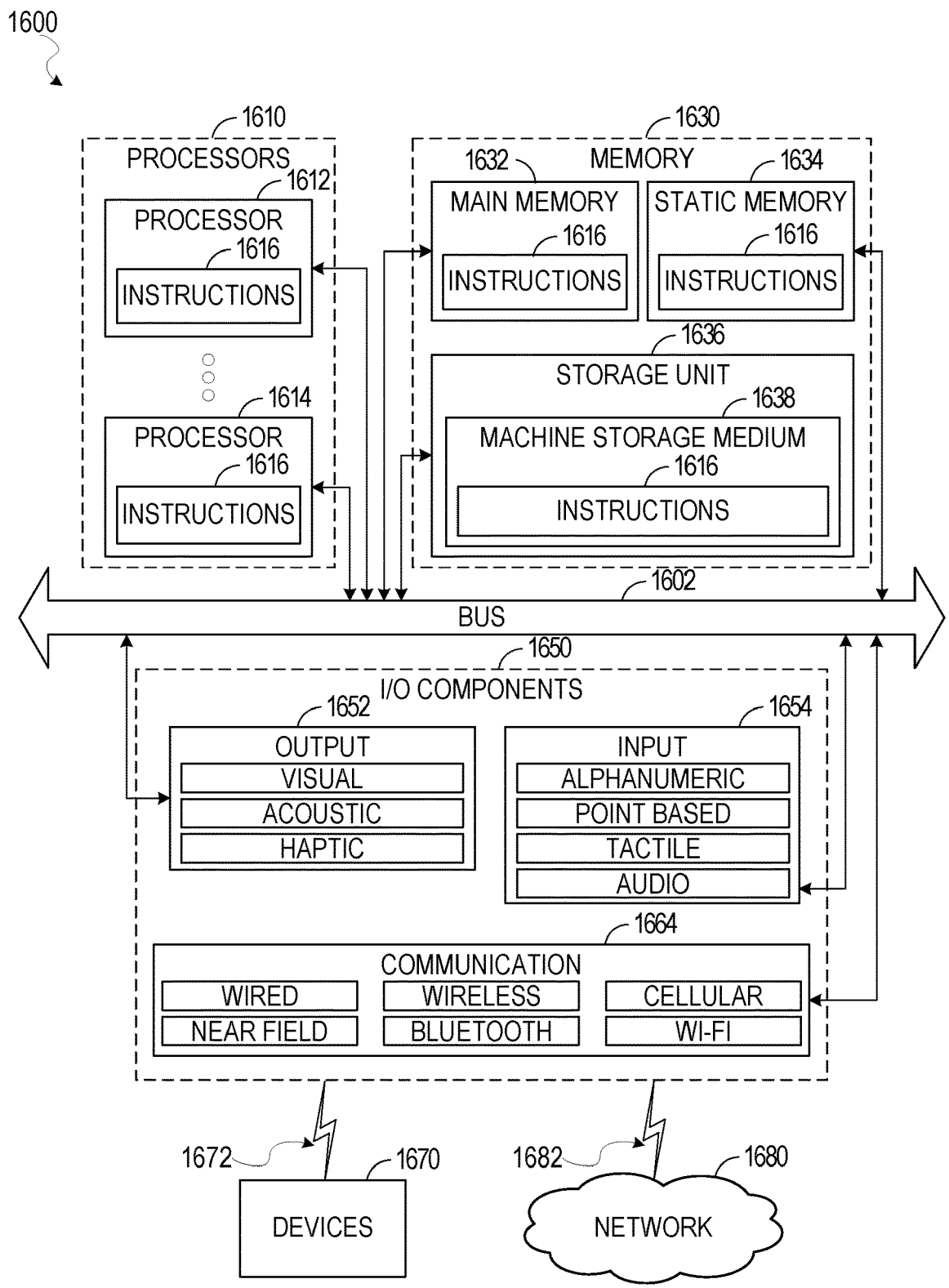
FIG. 16 illustrates a diagrammatic representation of a machine in the form of a computer system within which a set of instructions may be executed for causing the machine to perform any one or more of the methodologies discussed herein, in accordance with some embodiments of the present disclosure.

FIG. 16 illustrates a diagrammatic representation of a machine 1600 in the form of a computer system within which a set of instructions may be executed for causing the machine 1600 to perform any one or more of the methodologies discussed herein, according to an example embodiment. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions 1616 may cause the machine 1600 to execute any one or more operations of method 500, method 600, and method 700. As another example, the instructions 1616 may cause the machine 1600 to implement portions of the data flows illustrated in at least FIG. 4. In this way, the instructions 1616 transform a general, non-programmed machine into a particular machine 1600 (e.g., the compute service manager 108 or a node in the execution platform 110) that is specially configured to carry out any one of the described and illustrated functions in the manner described herein.

In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 includes processors 1610, memory 1630, and input/output (I/O) components 1650 configured to communicate with each other such as via a bus 1602. In an example embodiment, the processors 1610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1612 and a processor 1614 that may execute the instructions 1616. The term "processor" is intended to include multi-core processors 1610 that may comprise two or more independent processors (sometimes referred to as "cores") that may execute instructions 1616 contemporaneously. Although FIG. 16 shows multiple processors 1610, the machine 1600 may include a single processor with a single core, a single processor with multiple cores (e.g., a multi-core processor), multiple processors with a single core, multiple processors with multiple cores, or any combination thereof.

The memory 1630 may include a main memory 1632, a static memory 1634, and a storage unit 1636, all accessible to the processors 1610 such as via the bus 1602. The main memory 1632, the static memory 1634, and the storage unit 1636 store the instructions 1616 embodying any one or more of the methodologies or functions described herein. The instructions 1616 may also reside, completely or partially, within the main memory 1632, within the static memory 1634, within machine storage medium 1638 of the storage unit 1636, within at least one of the processors 1610 (e.g., within the processor's cache memory), or any suitable combination thereof, during execution thereof by the machine 1600.

The I/O components 1650 include components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or another suitable device to interface with the network 1680. In further examples, the communication components 1664 may include wired communication components, wireless communication components, cellular communication components, and other communication components to provide communication via other modalities. The devices 1670 may be another machine or any of a wide variety of peripheral devices (e.g., a peripheral device coupled via a universal serial bus (USB)). For example, as noted above, the machine 1600 may correspond to any one of the compute service manager 108 or the execution platform 110, and the devices 1670 may include the client device 114 or any other computing device described herein as being in communication with the network-based database system 102 or the cloud storage platform 104.

Executable Instructions and Machine Storage Medium

The various memories (e.g., 1630, 1632, 1634, and/or memory of the processor(s) 1610 and/or the storage unit 1636) may store one or more sets of instructions 1616 and data structures (e.g., software) embodying or utilized by any one or more of the methodologies or functions described herein. These instructions 1616, when executed by the processor(s) 1610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to the devices 1670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1616 for execution by the machine 1600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   receiving a statement to initiate an online index building process of an index of a hybrid table from a set of hybrid tables, the set of hybrid tables being stored in a distributed data store provided by a networked database system;
   initiating the online index building process of the index in response to receiving the statement;
   determining, during the online index building process, that the index can be generated;
   performing, during the online index building process, a write operation to store an index record indicating an initial status of the online index building process, the index record being stored in a metadata database provided by the networked database system, the metadata database being different than the distributed data store;
   performing, during the online index building process, a statement fencing process;
   performing a back-filling process of the index, the back-filling process including, in the index, a new index record for each record from the hybrid table;
   validating the index, the validating comprising:
   retrieving, by a compute service manager, a first metadata version of the hybrid table from the metadata database;
   sending, by the compute service manager, the first metadata version of the hybrid table to an execution node;
   retrieving, by the execution node, a second metadata version of the hybrid table from the distributed data store;
   comparing, by the execution node, the first metadata version with the second metadata version; and
   determining, by the execution node, that the second metadata version is less than or equal to the first metadata version; and
   in response to successfully validating the index, indicating in a particular entry of the index that validation of the index has succeeded.

2. The system of claim 1, wherein the statement comprises a particular statement to create an index.

3. The system of claim 1, wherein the statement comprises a particular statement to alter a table with a constraint.

4. The system of claim 3, wherein the constraint comprises that a set of values of a key is unique within the table.

5. The system of claim 3, wherein the constraint comprises a foreign key referencing a primary key or unique key of a second table, the second table being different than the table.

6. The system of claim 1, wherein determining that the index can be generated comprises:
   determining that a second index with a same name as the index does not exist; and
   determining that another index is not currently being generated.

7. The system of claim 1, wherein performing the write operation to store the index record comprises:
   updating a table persistence object corresponding to a table in the metadata database, the updating blocking other data definition language (DDL) operations that modify the table while the online index building process is occurring.

8. The system of claim 1, wherein the operations further comprise:
   performing a scan of the index to check uniqueness or referential integrity validity of each index record, wherein a scanner thread is initiated that goes over the index and verifies the uniqueness or referential integrity validity of each index record in the index.

9. The system of claim 8, wherein the statement fencing process comprises:
   scanning, by the execution node worker, a set of active transactions, each active transaction targeting a same table, the same table corresponding to the hybrid table; and
   determining, by the execution node worker, that each active transaction from the set of active transactions has completed.

10. A method comprising:
    receiving a statement to initiate an online index building process of an index of a hybrid table from a set of hybrid tables, the set of tables being stored in a distributed data store provided by a networked database system;
    initiating the online index building process of the index in response to receiving the statement;
    determining, during the online index building process, that the index can be generated;
    performing, during the online index building process, a write operation to store an index record indicating an initial status of the online index building process, the index record being stored in a metadata database provided by the networked database system, the metadata database being different than the distributed data store;
    performing, during the online index building process, a statement fencing process;
    performing a back-filling process of the index, the back-filling process including, in the index, a new index record for each record from the hybrid table;
    validating the index, the validating comprising:
    retrieving, by a compute service manager, a first metadata version of the hybrid table from the metadata database;
    sending, by the compute service manager, the first metadata version of the hybrid table to an execution node;
    retrieving, by the execution node, a second metadata version of the hybrid table from the distributed data store;
    comparing, by the execution node, the first metadata version with the second metadata version; and determining, by the execution node, that the second metadata version is less than or equal to the first metadata version; and in response to successfully validating the index, indicating in a particular entry of the index that validation of the index has succeeded.

11. The method of claim 10, wherein the statement comprises a particular statement to create an index.

12. The method of claim 10, wherein the statement comprises a particular statement to alter a table with a constraint.

13. The method of claim 12, wherein the constraint comprises that a set of values of a key is unique within the table.

14. The method of claim 12, wherein the constraint comprises a foreign key referencing a primary key or unique key of a second table, the second table being different than the table.

15. The method of claim 10, wherein determining that the index can be generated comprises:

determining that a second index with a same name as the index does not exist; and determining that another index is not currently being generated.

16. The method of claim 10, wherein performing the write operation to store the index record comprises:

updating a table persistence object corresponding to a table in the metadata database, the updating blocking other data definition language (DDL) operations that modify the table while the online index building process is occurring.

17. The method of claim 10, further comprising:

performing a scan of the index to check uniqueness or referential integrity validity of each index record.

18. A non-transitory computer-storage medium comprising instructions that, when executed by one or more processors of a machine, configure the machine to perform operations comprising:

receiving a statement to initiate an online index building process of an index of a hybrid table from a set of hybrid tables, the set of tables being stored in a distributed data store provided by a networked database system;

initiating the online index building process of the index in response to receiving the statement;

determining, during the online index building process, that the index can be generated;

performing, during the online index building process, a write operation to store an index record indicating an initial status of the online index building process, the index record being stored in a metadata database provided by the networked database system, the metadata database being different than the distributed data store;

performing, during the online index building process, a statement fencing process;

performing a back-filling process of the index, the back-filling process including, in the index, a new index record for each record from the hybrid table;

validating the index, the validating comprising:

retrieving, by a compute service manager, a first metadata version of the hybrid table from the metadata database;

sending, by the compute service manager, the first metadata version of the hybrid table to an execution node;

retrieving, by the execution node, a second metadata version of the hybrid table from the distributed data store;

comparing, by the execution node, the first metadata version with the second metadata version; and determining, by the execution node, that the second metadata version is less than or equal to the first metadata version; and in response to successfully validating the index, indicating in a particular entry of the index that validation of the index has succeeded.

* * * * *